United States Patent [19]

Atkins et al.

[11] Patent Number: 5,600,825

[45] Date of Patent: Feb. 4, 1997

[54] METHOD AND APPARATUS FOR DISPLAYING ON COMPUTER DISPLAY DEVICE A PORTION OF SORTED LIST AND CORRESPONDING INDICATOR OF LOCATION WITHIN LIST

[75] Inventors: Andreas F. W. Atkins, Santa Clara; Eric M. Trehus, Milpitas, both of Calif.

[73] Assignee: Apple Computer, Inc., Cupertino, Calif.

[21] Appl. No.: 60,453

[22] Filed: May 10, 1993

[51] Int. Cl.$^6$ ................................. G06F 7/00; G06T 1/00
[52] U.S. Cl. ........................ 395/607; 345/123; 395/340; 364/DIG. 2; 364/927.2; 364/927.62
[58] Field of Search ...................................... 395/144–149, 395/155–160, 600; 345/123–125, 121

[56] References Cited

U.S. PATENT DOCUMENTS

| | | | |
|---|---|---|---|
| 4,831,556 | 5/1989 | Oono | 395/157 |
| 5,333,247 | 7/1994 | Gest et al. | 395/138 |
| 5,339,391 | 8/1994 | Wroblewski et al. | 395/157 |
| 5,371,846 | 12/1994 | Bates | 395/157 |

OTHER PUBLICATIONS

"Inside MacIntosh, vol. VI", Chapter 14, Addison–Wesley Publishing Company, Inc., (1991), Apple Computer, Inc., pp. 14–5 to 14–140.

Primary Examiner—Paul V. Kulik
Attorney, Agent, or Firm—Helen Plotka Workman

[57] ABSTRACT

This invention provides a method and apparatus for displaying on a computer display device both a portion of a sorted list of unknown length having a plurality of items and an indicator which is a corresponding approximation of a location of the portion within the list. For a sorted list, keys pertaining to a characteristic used to sort the list are assigned key order values which are indicator values corresponding to a current position within the list. The first key and last key in the list are used to determine a range of values for the indicator. Keys may be arranged in groupings. In that case the keys within a particular grouping are mapped to the same key order value. Preferably, groupings are defined according to a statistical probability of occurrence of the members of the grouping such that each grouping has substantially the same statistical probability of occurring. Preferably, the mapping of keys or groupings is stored in a table such that given a particular key or grouping, an associated indicator value may be found and, likewise, that given a particular indicator value, an associated key or grouping may be found. The indicator reflects a relative location of a portion of the list being displayed with respect to the entire list. When a display of the list changes such that an item of a new key or grouping is being displayed, the display of the indicator changes to reflect the new positioning within the list. If a user changes the position of the indicator, a portion of the list approximately relating to the new indicator position is displayed in the display area.

18 Claims, 20 Drawing Sheets

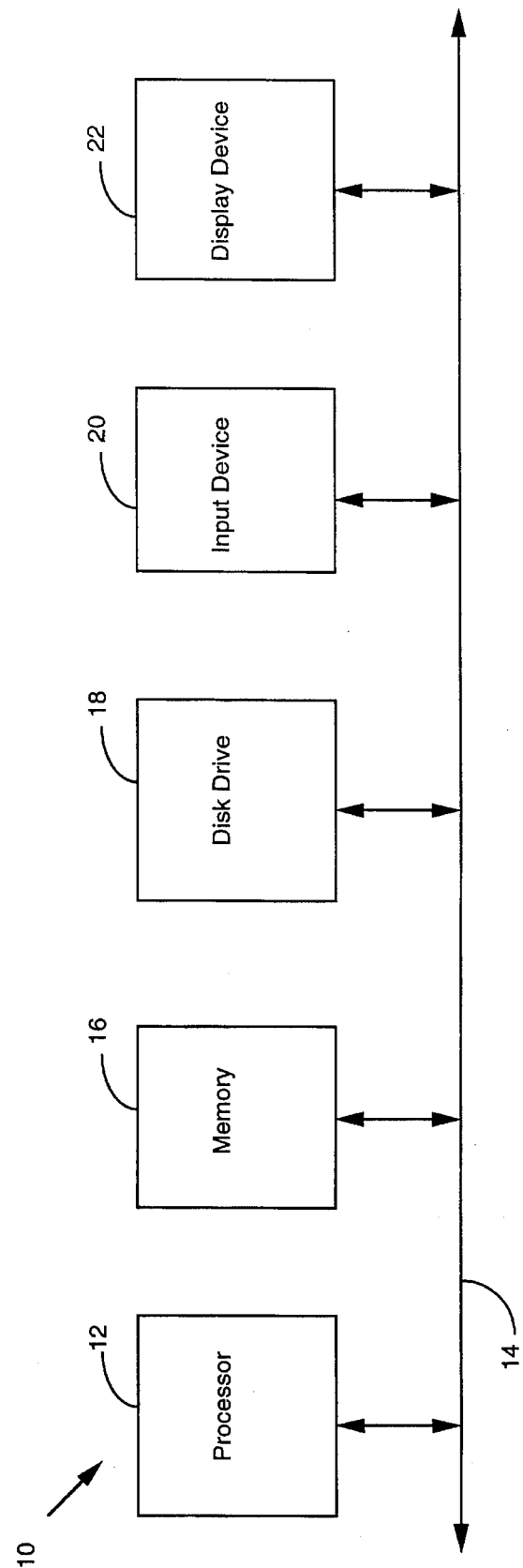

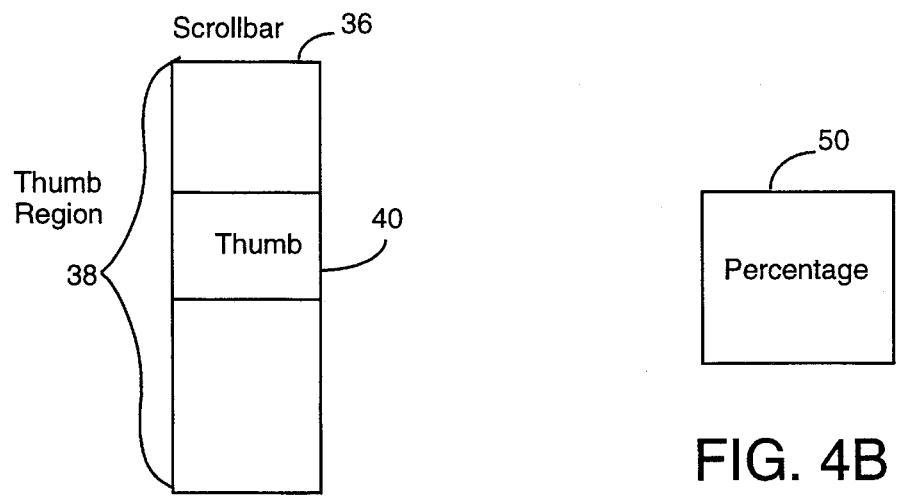
FIG. 4A
FIG. 4B
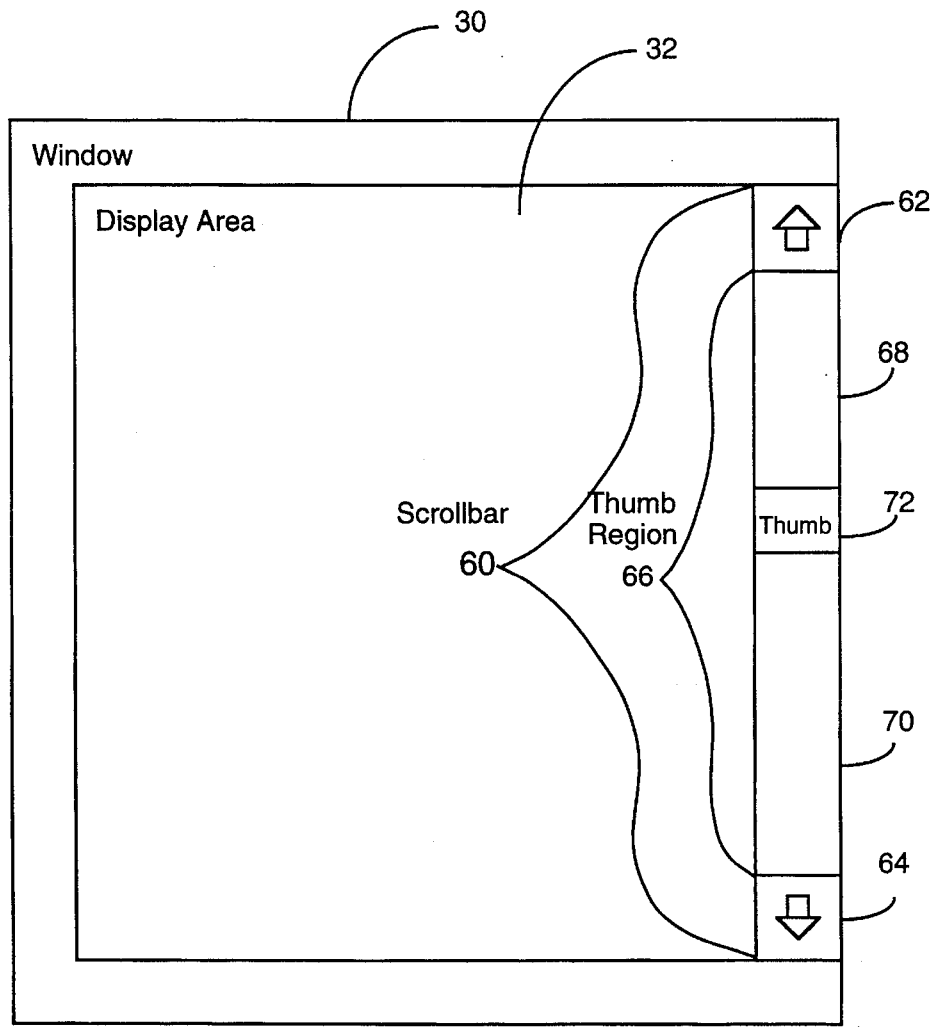
FIG. 5

METHOD AND APPARATUS FOR DISPLAYING ON COMPUTER DISPLAY DEVICE A PORTION OF SORTED LIST AND CORRESPONDING INDICATOR OF LOCATION WITHIN LIST

This invention relates generally to positioning a cursor within a list and more specifically to a method and apparatus on a computer device for approximating a current position within a sorted list.

Various controls are typically provided for a user to navigate through a list of items, also called entries or lines, displayed in a display area such as a window on a computer display device. When a list is too long to be displayed in its entirety in a window, a portion of the list is usually displayed. Typically, the controls provide movement through the list and are used to change what is visible in the window.

These controls may be, for example, arrows, buttons, page-turners or a scroll bar. In addition to providing movement through a list, a scroll bar also indicates a current position in the list.

A scroll bar includes a scroll bar thumb (for example element 72 in FIG. 5) which serves two purposes. First, it indicates the relative position of the entries in the window with respect to the list in which they reside. Basically, it is a relatively strict representation of a current position in the list. Second, this thumb can be moved to reposition within the list in order to display other entries. For example, a user can drag the thumb to a new location in the scroll bar, thereby causing the portion of the list corresponding to that new location to be displayed in the window.

Typically, the number of positions where a thumb may be located is determined by one of two methods. As described, these methods are designed to have information from the list on substantially all of the available lines within a window. For example, if there are 20 lines in a window, then these methods provide for scrolling until the last entry in the list is displayed in the last line in the window. However, these methods can be modified to permit the last entry in the list to be displayed on lines other than the last line, e.g. the first line in the window.

Basically, the number of positions depends upon the number of sets of contiguous lines or entries which can be displayed in a window. In the first method, the number of positions is based on the number of entries capable of being displayed in the window. In that case, the number of positions is equal to the total number of entries in the list minus the number of entries capable of being displayed in the window plus one.

For example, if the list contains 100 entries and the window permits 20 entries to be simultaneously displayed, then the scroll bar is divided into 81 positions. That is to say, there are 81 sets of contiguous entries, each set containing 20 entries. Thus, the thumb may be positioned in any of 81 available locations. If the tenth item is a current position in the list, then the scroll bar thumb is positioned at the tenth of the 81 available locations or, in other words, the tenth set of contiguous entries in the list is displayed in the window.

In the second method, the number of positions available for the thumb is based on the number of vertical pixels of the window. In that case, the number of available positions is equal to the total number of vertical pixels in the entire list minus the number of vertical pixels of the window plus one. For example, if the list is 100 vertical pixels long and the window is 20 vertical pixels long, then the thumb may occupy any of 81 available locations. In other words, there are 81 sets of contiguous entries in the list where each set occupies 20 vertical pixels.

The first and second methods described use the total number of entries or pixels in the list. However, in some cases, these values are unknown or difficult to ascertain. In addition, there may not be enough resources to read an entire list into memory.

For example, the total number of items in a list may be unknown. This may occur, for example, during a database query where it is unknown how many items will be returned in response to the query. Since the database service answering the query does not know in advance what the query will be, it typically does not provide the total number of items contained in its response to the query.

In some situations the number of items received in response to a query may be too numerous to read an entire list into memory. In that case, typically portions of the list are read into memory in consecutive order. For example, in order to display the one hundredth item in a list, the first ninety nine items must be read into memory. In this case, substantially all of the list must be read into memory in order to display the items at or near the end of the list. This can be a waste of computer resources, if a substantial number of items in the list are not significantly viewed by a user.

In some systems today, when a current position within a list or the length of the list is unknown, the system starts at the top of the list and enumerates down the list, reading those entries into memory, adjusting the thumb of the scroll bar as new information is read into memory. For example, if the fiftieth line out of 120 lines of text is being viewed, the thumb is positioned at the fiftieth position. If the window contains 20 lines, then the scroll bar has 101 available positions (120−20+1=101). In viewing the fiftieth line the thumb is positioned exactly in the middle of the bar (50/101 is approximately 50%). If another 100 lines of text gets added to the end of the current text, then even though you continue to view the 50th item and the thumb is positioned at the 50th position, the bar now has 120+100−20+1=201 available positions. This means that the thumb is now positioned only a quarter of the way down the control bar. (50/201 is approximately 25%). Thus, the thumb moves even though the position within the list remains constant. This can be disconcerting to a user because the thumb continuously jumps up as the list is being read into memory.

SUMMARY OF THE INVENTION

This invention provides a method and apparatus for displaying on a computer display device both a portion of a sorted list of unknown length having a plurality of items and an indicator which is a corresponding approximation of a location of the portion within the list. Keys pertaining to a characteristic of the entries in the list are sorted and mapped to non-decreasing key order values. Keys are not necessarily unique; a key can be any kind of identifier of an entry in a list.

Multiple keys may be mapped to the same key order value forming a "grouping". Preferably, groupings are defined according to a statistical probability of occurrence of the members of the grouping such that each grouping has substantially the same statistical probability of occurring.

For a list having items which are sorted according to the keys, the range of indicator values is a subset of the key order values assigned to a set of keys. This subset contains the key order values for the keys in the list. This subset or range contains key order values which are between the key order value of the key of the first item in the list, herein called "a minimum indicator value", and the key order value of the key of the last item in the list, herein called "a maximum indicator value", as well as the minimum and maximum indicator values themselves. The number of key order values in this range can be determined by subtracting the minimum indicator value from the maximum indicator value and adding one to the sum. Optionally, the range of indicator values may be expanded to include values in addition to this subset which are mapped to the top and bottom of the list. An indicator value is the same as a key order value, except in the case where the minimum and maximum indicator values are mapped to the top and bottom of a list, respectively.

A system incorporating the invention includes means for accessing a key of a particular item in the list. Using this mechanism the keys of the first and last items are accessed in order to then map them to a key order value.

A line or area, i.e. a plurality of lines, within a display area is selected as a reference line or reference area. A current indicator value specifying a current position within a list is determined by looking up the key order value to which the key at the reference line was mapped. That key order value is the indicator value which together with the range of indicator values, i.e. the minimum and maximum indicator values, specifies a relative current location within the list.

For example, if the minimum indicator value is 1 and the maximum indicator value is 10, then the range of indicator values is 1 through 10. If the key at the reference line corresponds to a key order code of 5 then the current indicator value is 5 and the relative current location is about halfway through the list.

The invention provides for display on a computer device of a selected region of the list and for display of the indicator to reflect the relative location of the selected region with respect to the entire list. If the selected region changes, the value of the indicator changes to the value corresponding to the selected region and, preferably, the new value of the indicator is displayed. Similarly, if the value of the indicator changes, then the selected region changes to the region within the list corresponding to the new value of the indicator. Preferably, the new value of the indicator and the new selected region or current grouping are displayed.

Preferably, the mapping of keys is stored in a table such that given a particular key, an associated indicator value, or in other words key order value, may be found and, likewise, that given a particular indicator value which corresponds to a key order value, an associated key may be found.

The invention provides for approximation of a current position within a list without knowing the size of the list or the exact current position. The invention is particularly useful when a list is too long to be read into memory at the same time, because it facilitates movement to any point in the list without reading the entire list into memory.

BRIEF DESCRIPTION OF THE DRAWINGS

The above and further advantages of the invention may be better understood by referring to the following description in conjunction with the accompanying drawings, in which:

FIG. 1 is a simplified block diagram of a computer device which may incorporate the invention;

FIGS. 4A and 4B are alternative embodiments of an indicator;

FIG. 5 shows a window having a scroll bar;

DETAILED DESCRIPTION OF ILLUSTRATIVE EMBODIMENT

Figure 2A:
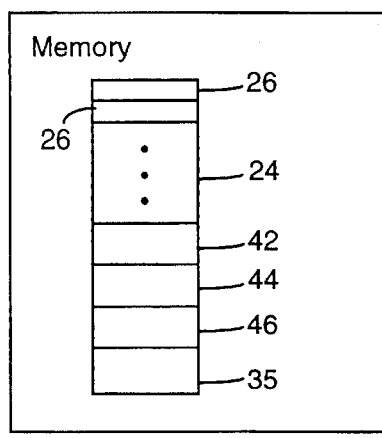
FIGS. 2A and 2B are simplified block diagrams of contents of a memory and a disk drive, respectively, of the computer device of FIG. 1.

FIG. 1 is a block diagram of a computer device 10 which may be used to implement the invention. It comprises a processor 12 such as a central processing unit ("CPU") which is coupled to a bus 14. The bus 14 is also coupled to a memory 16, a disk drive 18, an input device 20 and a display device 22.

The computer device 10 can be any of a personal computer, workstation, minicomputer or large computer, or other specialized computing device. The computer device 10 may be connected to a network (not shown) such as a local-area network, high-speed bus or other interconnecting mechanism for exchanging messages and data, such as AppleTalk, Ethernet or Token Ring.

The input device 20 can be a keyboard, mouse, external disk drive or other input device.

The display device 22 can be a monitor or other display device having a screen 23 on which text, graphics or other images can be displayed and viewed.

Numerous types of computer systems may be used, but in the present embodiment, computer software is usually stored on the disk drive 18 and brought into memory 16 over the bus 14 in response to commands issued over bus 14 by the CPU 12. Preferably, the CPU 12 runs an operating system which, possibly together with specialized hardware, supports windowing, i.e. the display and functioning of multiple windows on a display device 22. An example of an operating system which may be used is a Macintosh System 7 operating system. For information on Macintosh operating systems, refer to "Inside Macintosh", Vols. I–VI, Addison-Wesley Publishing Co. (1985–1991). "Macintosh" is a registered trademark and "System 7" is a trademark of Apple Computer, Inc.

Figure 2B:
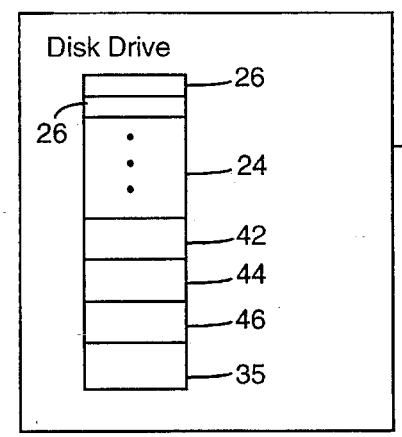

As shown in FIGS. 2A and 2B, a list 24 is located in the memory 16 or on the disk drive 18 of a computer device 10. A first computer device 10*a* can access a list 24 on a second computer device 10*b* via a computer network (not shown), thereby reading the list 24, or portions thereof, into the memory 16 or the first computer device. A list 24 contains one or more items 26, also called "lines" or "entries".

The computer device 10 may include software which provides information retrieval services. e.g. America Online, and databases, e.g. Oracle or 4-D, or it may access such software from another computer device connected to it via a network (not shown). Oracle is available from Oracle Systems Corp., Redwood City, Calif. and 4-D is available from Acius, Cupertino, Calif. This software can be accessed by other software applications running on the computer device 10 and may return a list of information or portions thereof in response to inquiries or commands received from a software application.

For example, a software application may request a list of users or a list of files from an information retrieval service. In response to that request, the information retrieval service returns the requested information which may be a list of unknown length.

Figure 3:
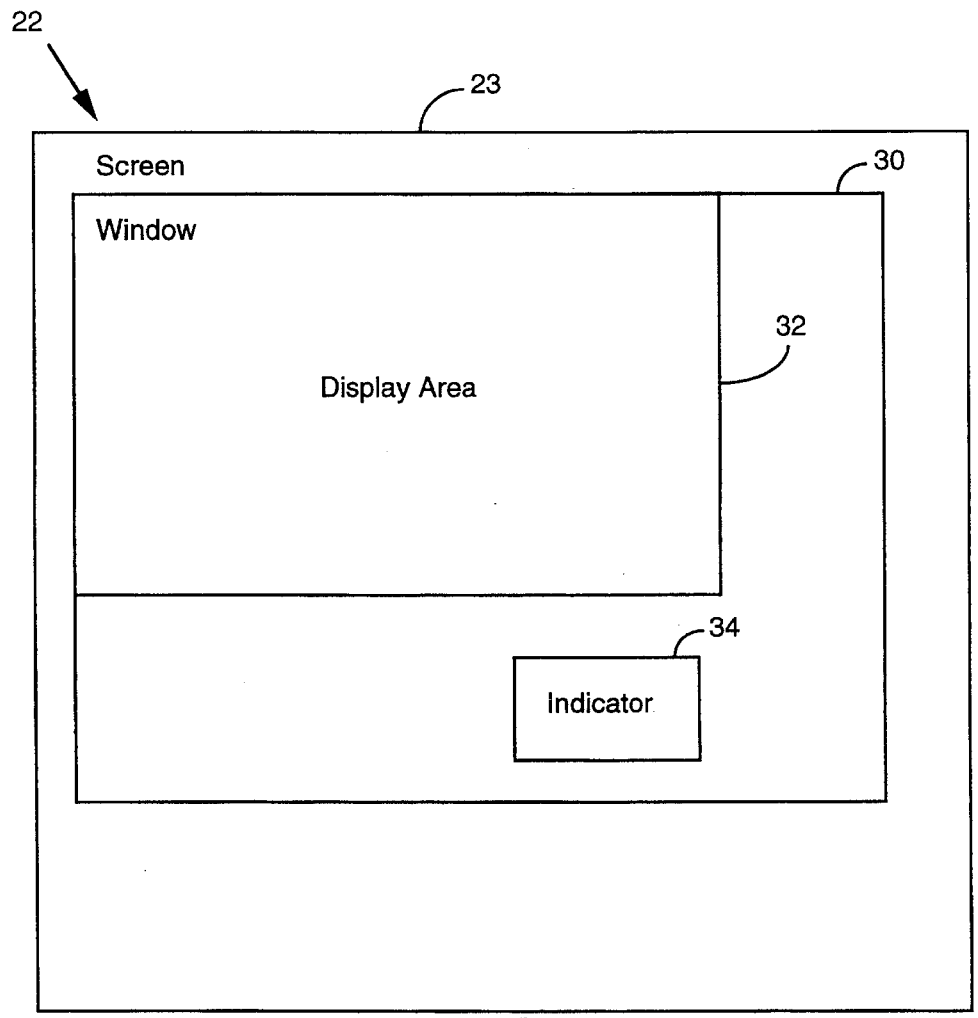
FIG. 3 is a simplified block diagram of a display device of a computer device of FIG. 1.

As shown in FIG. 3, preferably display device 22 displays at least one window 30. A window 30 has a display area 32 and a position indicating means, also called an indicator 34, for indicating a position within a list 24. The display area 32 is a portion of the window 30 in which some, if not all, items 26 from the list can be displayed. The number of items 26 which can be displayed simultaneously within a display area 32 depends upon the size and dimensions of the display area 32.

Preferably, indicator 34 specifies a location within the list which is being partially or wholly displayed in the display area 32. The indicator 34 may be for example a scroll bar or other like mechanism 36 (FIG. 4A) having a thumb 40 disposed within a thumb region 38. The thumb 40 is capable of movement through the thumb region 38 such that the location of the thumb in the thumb region corresponds to a particular location in the list 24. For example, the relative location of the thumb 40 in the thumb region 38 may correspond to the relative location of the items 26 being displayed in the display area 32 with respect to the list 24 as a whole.

A value of an indicator 34 in a scroll bar or other like mechanism corresponds to a thumb location within the thumb region. For example, a value of zero may correspond to an uppermost location in a vertically-oriented thumb region or a leftmost location in a horizontally-oriented thumb region. Values for the indicator may then increase as the thumb location approaches a maximum value, i.e. the lowermost location in a vertically-oriented thumb region or the rightmost location in a horizontally-oriented thumb region.

As shown in FIGS. 2A and 2B, memory 26 or disk drive 18 may contain a minimum indicator value 42, a maximum indicator value 44 and a current indicator value 46 specifying a current value for the indicator. Optionally, a number-of-available-positions specifier 35 may be located in memory 26 or disk drive 18 to indicate the number of available positions for an indicator 34. Together, the minimum indicator value 42 and maximum indicator value 44 indicate a range of indicator values such as an integer range. For example, if the minimum indicator value 42 is 1 and the maximum indicator value is 5, then together they specify a range of 5 indicator values, 1,2,3,4 and 5. Depending on the display device and the size of the scroll bar, there may not be enough resolution to display the thumb at all of the calculated indicator values.

The current indicator value 46, together with the minimum indicator value 42 and the maximum indicator value 44 provides as approximation of a current relative position within the list. In the preceding example, if the current indicator value 46 is 4, then the current relative position is 4/5 of the way down the list and the indicator display indicates such positioning.

Another example of an indicator 34 is a percentile marker 50, as shown in FIG. 4B. In that case, the percentile marker specifies a percentage corresponding to the location of the items being displayed in the display area with respect to the list 24 as a whole. For example, if the items being displayed were in the middle of the list 24, then the percentile marker would specify 50%.

Other examples of position indicators (not shown) include a slide rule, a clock or pie, a thermometer, a progress bar and a mini-page. Unlike a scroll bar, these indicators indicate positioning within a list, but do not allow a user to manipulate them in order to change that positioning. Usually, a mini-page is a miniaturized representation of the list with an arrow or other delineating means specifying where the current position is within the list.

FIG. 5 shows a scroll bar 60 having a "line tip" region 62, a "line down" region 64 and a thumb region 66. Activating the "line up" region 62 reveals an entry above the entry which is displayed in the top line of the window when it is activated, while activating the "line down" region 64 reveals an entry below the entry being displayed in the bottom line of the window when the "line down" region is activated.

Thumb region 66, analogous to thumb region 38, includes a "page up" region 68, a "page down" region 70 and a thumb 72, similar to thumb 40. The "page up" and "page down" regions permit the entries in the window to be scrolled up or scrolled down, respectively, by one page, where a page is equivalent to the number of entries capable of being displayed simultaneously in the window.

Activating the "page up" region reveals a page of entries above the entry being displayed at the top line of the window at the time of activation. Similarly, activating the "page down" region reveals a page of entries below the entry being displayed in the bottom line of the window at the time of activation. Near the top of the list less than a page of entries may be revealed upon activation, depending upon the number of entries in the list between the top of the list and the entry being displayed in the top line of the window. Likewise, near the bottom of the list less than a page of entries may be revealed upon activation of the "page down" region, depending upon the number of entries in the list between the bottom of the list and the entry being displayed in the bottom line of the window.

Figure 6:
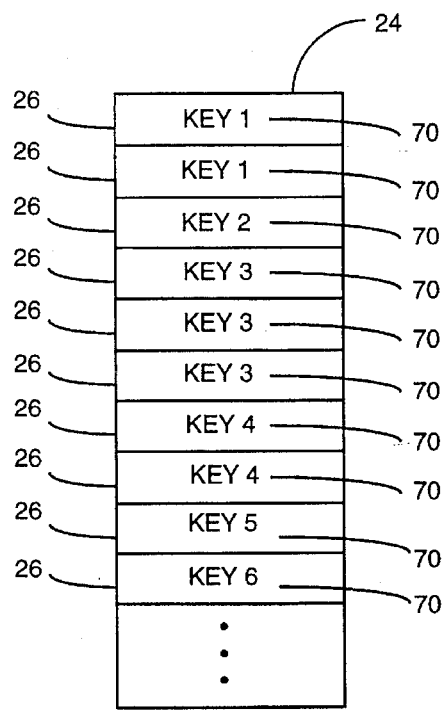
FIG. 6 shows a sorted list.

FIG. 6 shows a sorted list 24. The list 24 is sorted according to keys 70 which pertain to a particular characteristic of the items of the list. This characteristic, for example, may be based on the character set of the items, in other words, the script, language and region used, as defined below. In that case, the keys are the characters and the items may be alphabetically sorted. Alternatively, it may be based on a characteristic inherent in the items themselves. For example, if the list contained different models of automobiles, the keys may be the different model names and the list may be sorted according to the models of the cars. The advantages of the invention are not dependent on any particular sorting criteria, thus the list 24 may be sorted according to virtually any sorting criteria, as long as the sorting criteria are known.

A script is a writing system used to represent human languages. Examples of scripts are Roman, Japanese and Arabic writing systems. A language is a body of written words and methods of combining words used by a particular group of people. A region denotes a linguistic or cultural entity that may or may not correspond to a geographic area. For information on how to obtain and use information about scripts, languages and regions on a Macintosh System 7 operating system, refer to "Inside Macintosh", Vol. VI, chapter 14, pages 14–5 to 14–139, Addisen-Wesley Publishing Co., (1991).

For purposes of the invention, it is important that the capability to randomly access information based on a given key is available. If an information retrieval service is being used to implement the invention, it should have the capability to randomly enumerate around a given key even if the provided key does not exist. Thus, given a key, the information retrieval service or other software embodying the invention, should return entries in the list having that key and possibly entries having keys preceding and/or following the given key.

Figure 7:
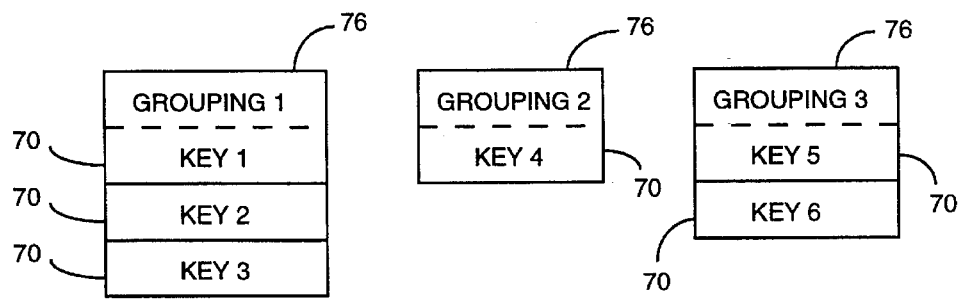
FIG. 7 shows groupings of keys.

As shown in FIG. 7, the keys 70 used to sort the list 24 can be organized into groupings 76. A grouping is a contiguous range of keys when sorted. Typically, a grouping is formed by assigning multiple contiguous keys to the same key order value. A grouping 76 may consist of a single key 70 or two or more consecutive keys. Preferably, groupings 76 are formed in a way that increases the uniformity of the statistical probability of occurrence across the groupings. More preferably, the groupings are formed such that each grouping has substantially the same statistical probability of occurrence as virtually any other grouping. The range of values for specifier 35 is based upon the number of keys or groupings.

For example, in a typical U.S. phone book, surnames beginning with the letter "s" occur more frequently than surnames beginning with the letter "u". The same is true for surnames beginning with the letters "v" and "w". Thus, by grouping the letter s into a first grouping and the letters "u", "v", and "w" into a second grouping, the statistical probabilities of occurrence for the two groupings are closer to each other, than the statistical probability of occurrence of the letter "s" is close to the statistical probability of occurrence of "u", "v", or "w" alone.

When indicator 34 is a scroll bar or scroll-bar-like mechanism, the thumb region is divided into subregions according to the groupings 76.

When indicator 34 is a percentile marker, percentile values are mapped to the groupings according to the relation of the location of the grouping within the list to the size of the list as a whole.

Figure 8:
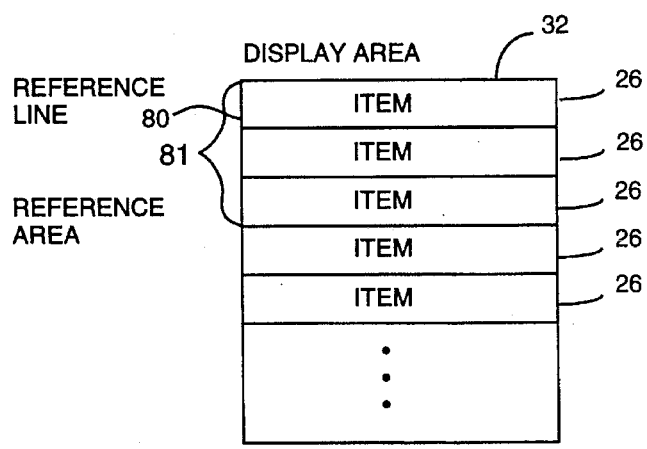
FIG. 8 illustrates a reference line in a display area.

As shown in FIG. 8, a display area 32 contains a reference line 80 or a reference area 81. The indicator 34 (FIG. 3) reflects an item 26 positioned at the reference line 80. The reference line 80 is used to determine when to change the value of an indicator 34 in response to repositioning within a list 24. When a list 24 is manipulated such that the item 26 displayed on the reference line 80 is a member of a different grouping 76 than the item which was previously displayed on the reference line, then the value of the indicator changes to a value corresponding to the grouping of the new item on the reference line.

The reference line 80 is also used when the value of an indicator 34 changes and positioning within a list 24 is updated to correspond to the new value of the indicator. In that case, the item 26 displayed on the reference line 80 is an item belonging to the grouping 76 which corresponds to the value of the indicator 34, preferably the first item in that grouping.

The reference line 80 may be any line in the display area 32. For example, the reference line 80 may be a first line in the display area 32, a middle line in the display area or a last line in a display area.

A reference area 81 contains one or more lines and is preferably defined by the top line and bottom line of the display area, thereby encompassing the items being displayed in the display area.

Figure 9A:
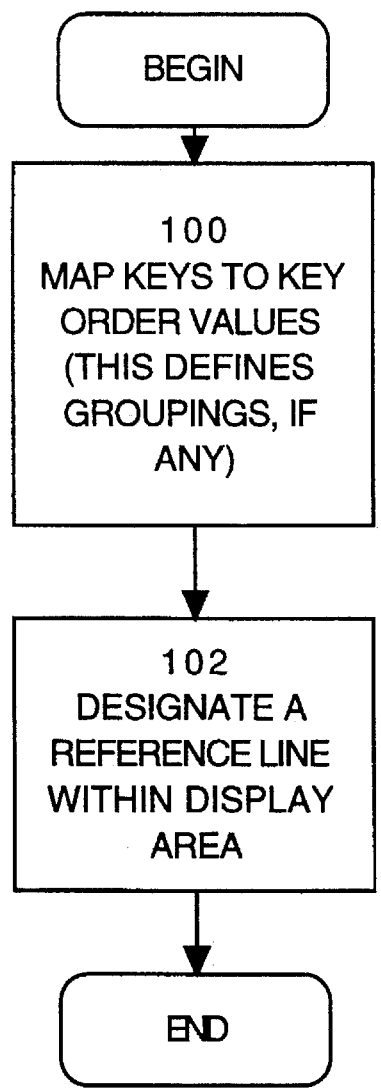
FIGS. 9A, 9B, 9C and 9D are flowcharts depicting steps of the invention performed before runtime and at runtime, respectively.
Figure 9B:
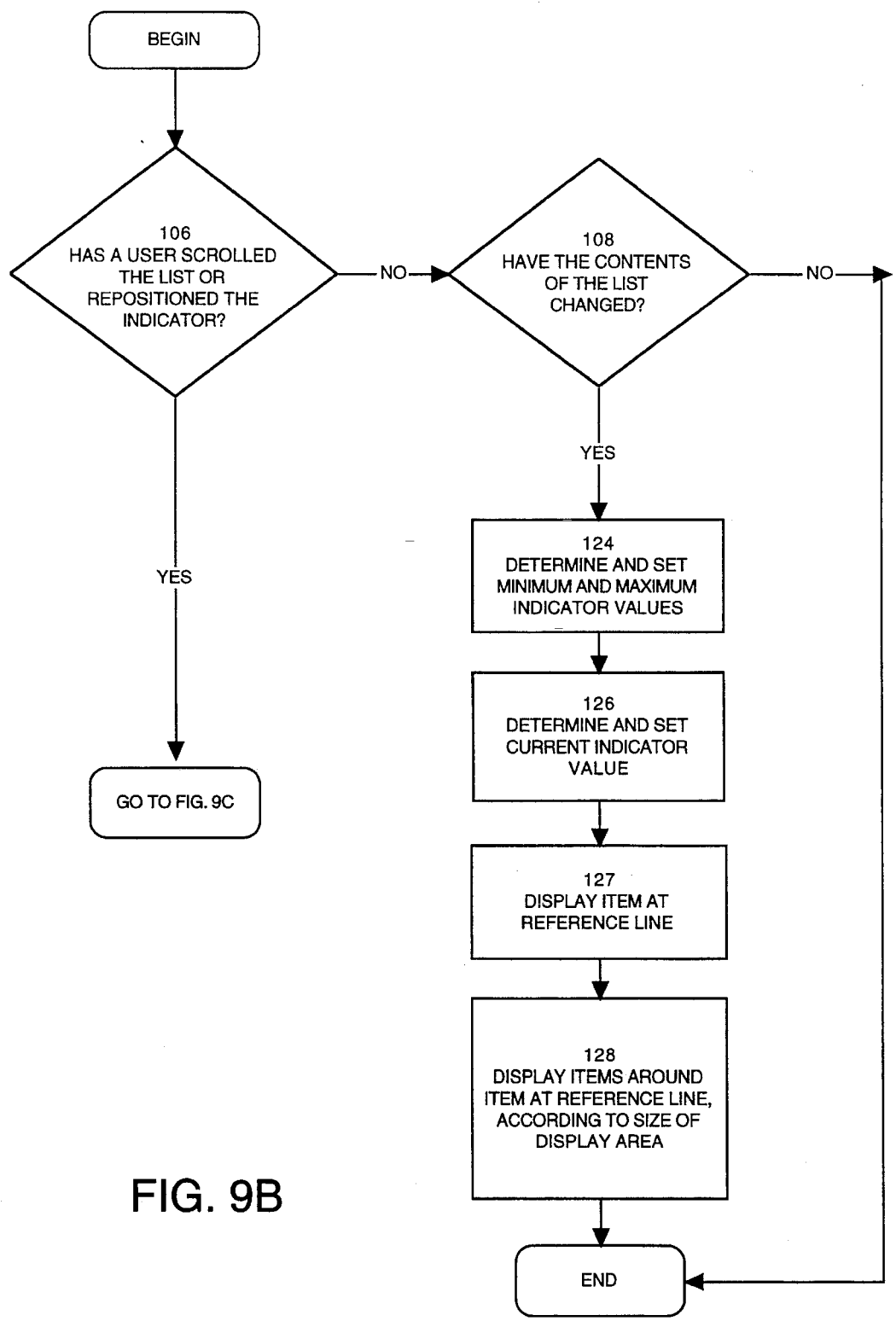
Figure 9C:
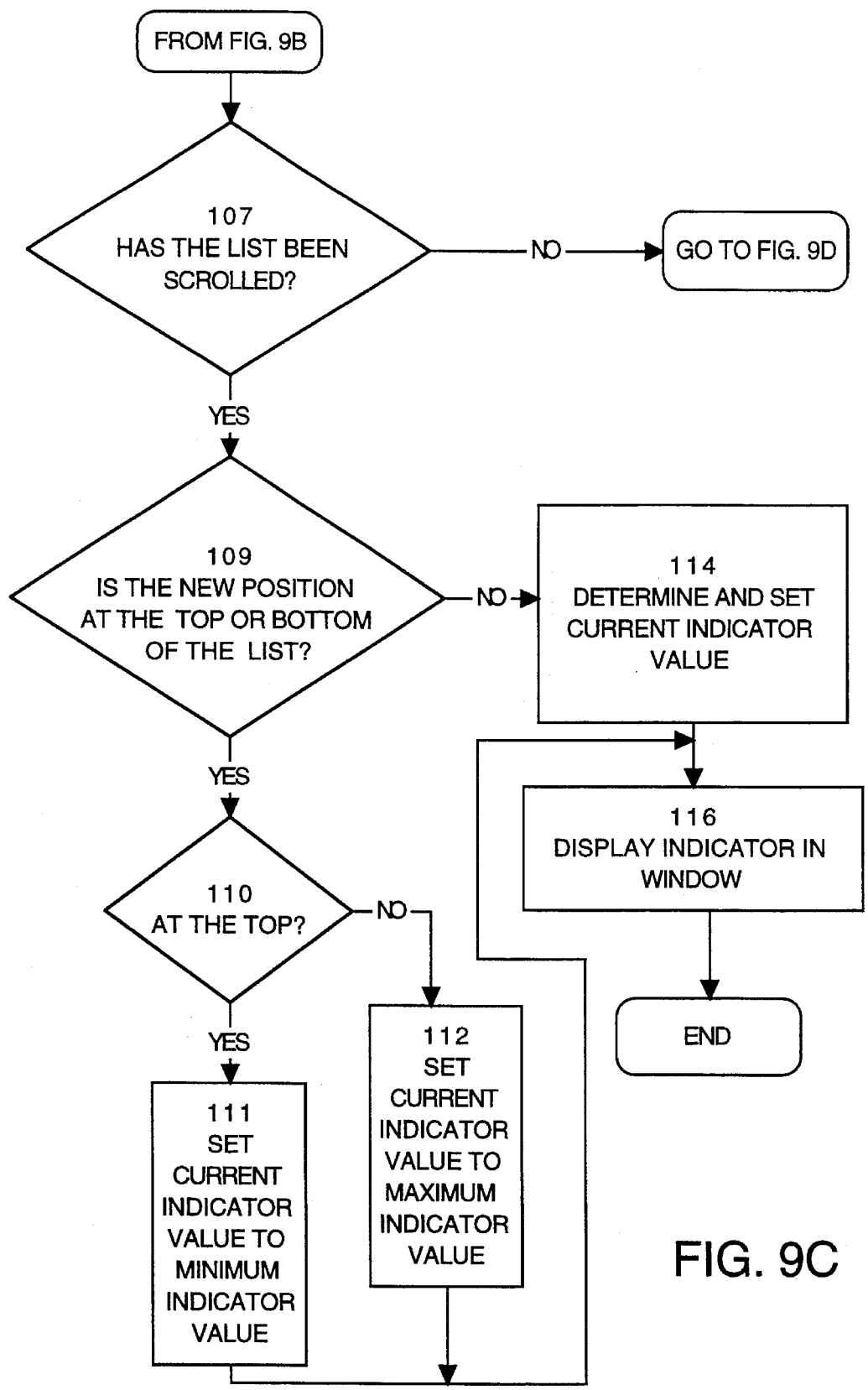
Figure 9D:
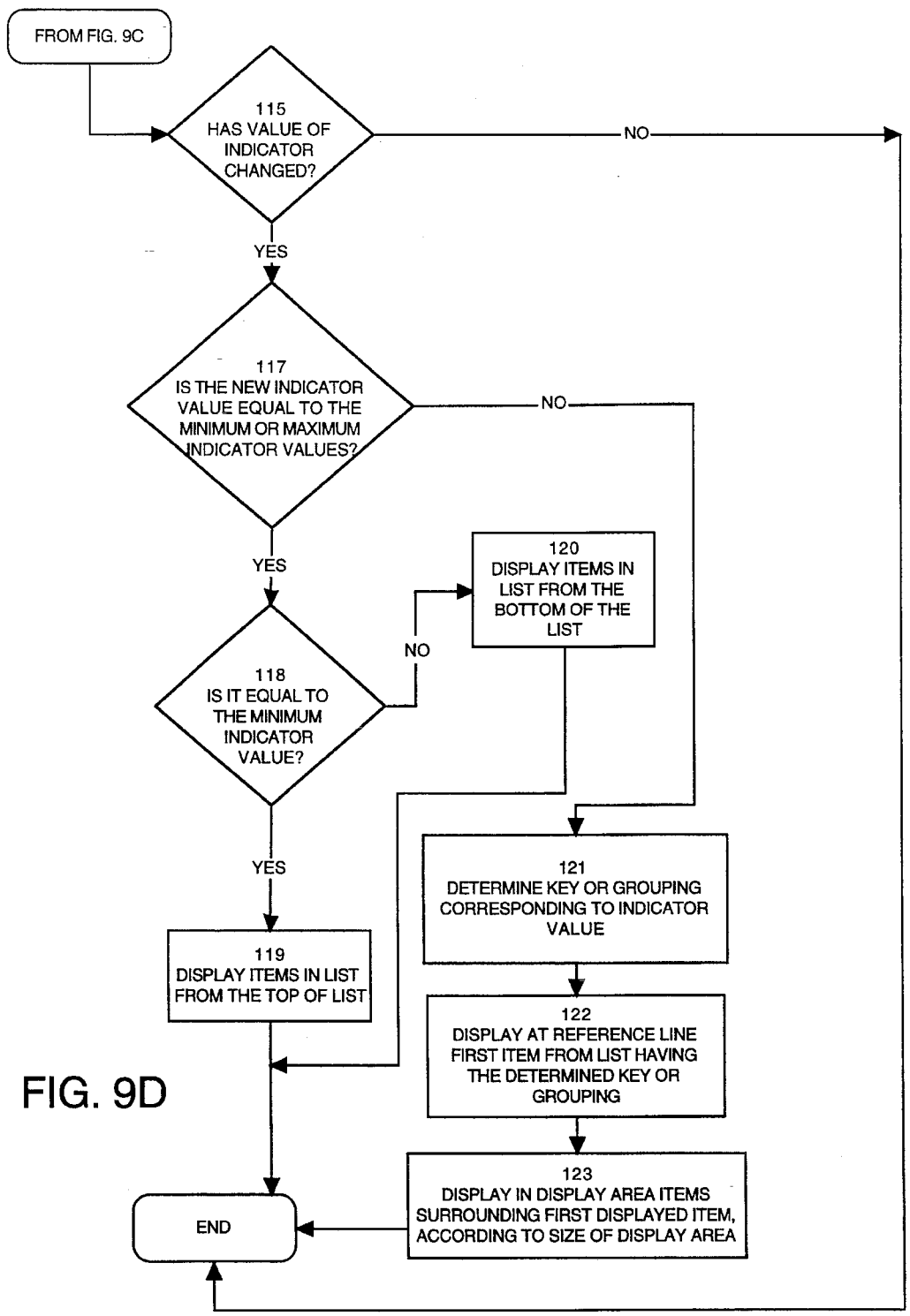

FIGS. 9A–9D are flow charts depicting the steps of the invention in general. FIG. 9A shows the steps which are performed during the design of an implementation of the invention, while FIGS. 9B–9D depict the steps which are performed at runtime when an implementation of the invention is being executed. As shown in FIG. 9A, at block 100 keys are mapped to key order values. Key order values are a range of non-decreasing values such as integers. Key order values are preferably contiguous or if not contiguous, then they are evenly-spaced. If the key order values are non-contiguous, but evenly spaced, then modifications which would be obvious to a person of ordinary skill may need to be performed on some of the determinations described in connection with the invention.

In general, key order values have a one-to-one correspondence to indicator values; in other words, a key order value is generally an indicator value and vice versa. The distinction between the two is that key order values are in the range of all possible keys, while indicator values are in the range of keys which exist in a particular list. Also, in some cases the range of indicator values may be expanded to include a mapping of the minimum and maximum indicator values to the top and bottom of a list, respectively. This situation is discussed in further detail in relation to FIG. 13. In the case of a scroll bar 60, an indicator value corresponds to a thumb location within the thumb region.

The mapping of keys to key order values may define groupings 76 of keys 70 by mapping keys to the same key order value. Groupings 76 may be defined by humans or automatically by a computer device using computer software designed for that purpose. As mentioned previously, a grouping 76 may contain a single key 70, therefore it is possible that each grouping may contain a single key, in which case the terms "grouping" and "key" can be used interchangeably.

Figure 10A:
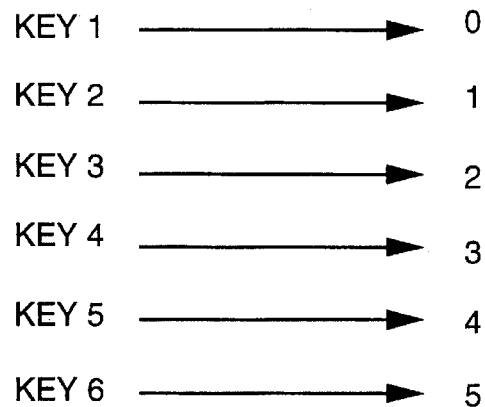
FIGS. 10A and 10B illustrate examples of mappings of keys to key order values.
Figure 10B:
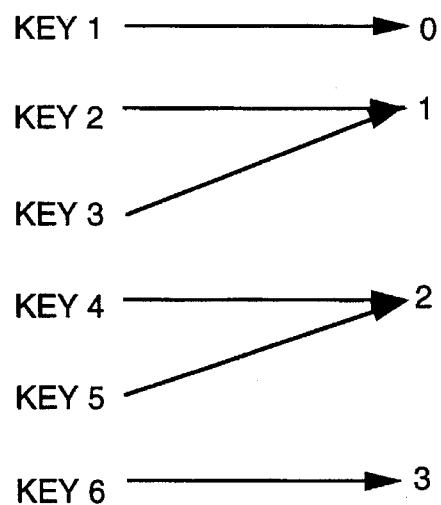

FIGS. 10A and 10B illustrate examples of mappings of keys to key order values. In FIG. 10A, each key is mapped to a unique key order value, while in FIG. 10B, multiple keys are mapped to the same key order value, thereby forming groupings.

At block 102 of FIG. 9A, a reference line 80 or reference area 81 is selected. This selection may occur prior to block 100, as well. The reference line 80 can be any line within a display area, e.g. a top line, a bottom line, a middle line, etc. The reference area 81 includes one or more lines. Preferably, the reference area 81 is defined by the top line and bottom line of the display area.

Figure 11:
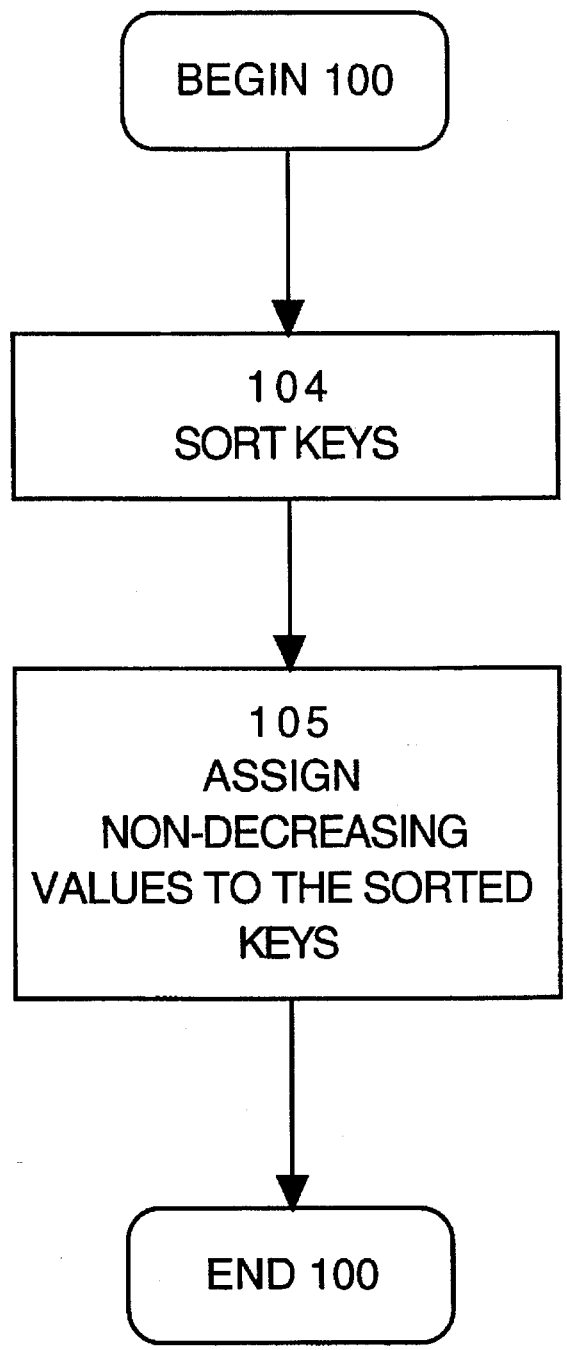
FIG. 11 is a more detailed flow chart of block 100 of the flow chart of FIG. 9A.

FIG. 11 illustrates steps performed at block 100 in FIG. 9A. At block 104, keys are sorted. At block 105, nondecreasing values, herein called "key order values", are assigned to the keys in sorted order. This mapping may be stored in memory or on the disk, for example, in a table format. Alternatively, this mapping may be algorithmically derived.

As shown in FIG. 9B, at decision block 106, if a user has scrolled the list or repositioned the indicator, then control passes to block 107 of FIG. 9C, otherwise control passes to block 108. At decision block 107 (FIG. 9C), if the list has been scrolled, then control passes to block 109 (FIG. 9C), otherwise control passes to block 115 of FIG. 9D. Information about the scrolling of the list or the movement of the indicator can be obtained by querying an operating system or a service.

With reference to FIG. 9C, at decision block 109, if the new position is at the top or the bottom of the display area, then control passes to decision block 110. This determination can be made by explicitly querying a service from which the list 24 was received or by reaching the top or bottom of the list while enumerating entries from the list. Otherwise, control passes to decision block 114.

At decision block 110, if the current position is at the top of the display area, then at block 111 the current indicator value is set to the minimum indicator value, i.e. the indicator value associated with the top of the list. Otherwise, at block 112 the current indicator value is set to the maximum indicator value, i.e. the indicator value associated with the bottom of the list. The routines in the appendix, discussed in further detail later, can be used to perform the steps for blocks 109 through 112. Control then passes to block 116 and the indicator is displayed based upon the current indicator value.

At block 114, the current indicator value is determined and set. In the case of a scroll bar, the current value of the indicator, in conjunction with the minimum and maximum indicator values indicates a location within the thumb region 66.

At block 116, the indicator 34 is displayed in window 30 according to the current indicator value, minimum indicator value and maximum indicator value. The minimum indicator value and maximum indicator value specify a range with which the current indicator value can be compared to determine an approximate current position in relation to the list as a whole. For example, if the minimum indicator value is 1 and the maximum indicator value is 50, then a current indicator value of 30 would result in the displayed indicator specifying an item in the list which is approximately located ⅗ down the list. In the case of a scroll bar, the thumb is displayed at the appropriate location within the thumb region 66. In the example, in the case of a vertical thumb region, the thumb would be displayed ⅗ of the way down the thumb region.

With reference to FIG. 9D, at decision block 115, if the value of the indicator has changed, then control passes to block 117. The value of the indicator may change, for example, when a user moves a scroll bar thumb to a position which corresponds to an indicator value that is different from the indicator value of the thumb's previous position.

At block 117, if the new indicator value is equal to the minimum or maximum indicator values then control passes to block 118, otherwise control passes to block 120. At block 118, if the new indicator value is equal to the minimum indicator value then at block 119 items are displayed by enumerating down from the top of the list, otherwise at block 120 items are displayed by enumerating up from the bottom of the list. The number of items displayed depends on the size of the display area.

At block 121, the key or grouping which corresponds to the new current indicator value is determined. At block 122, the first item from the list which has the key or grouping determined at block 121 is displayed at the reference line 80. At block 123, the items surrounding that first item are appropriately displayed in the display area 32. For example, if a display area 32 has twenty lines and the tenth line is the reference line 80, then the first item 26 in the grouping 76, determined at block 121, will be displayed at the tenth line and the nine items in the list 24 preceding that first item in the grouping will be displayed in order in lines one through nine of the display area, one item per line. Likewise, the ten items in the list following the first item in the grouping will be displayed in order in lines eleven through twenty of the display area, one item per line.

With reference again to FIG. 9B, at block 108, if the contents of the list have changed, then at block 124 the minimum and maximum indicator values are determined and set and at block 126 the current indicator value is determined and set. Block 126 is the same as block 114. The check at block 108 can be accomplished by querying the service to find out if the information in the list has changed. A first time handling a new list is considered to be the same as the contents of a list changing. Preferably, the minimum and maximum indicator values are stored in memory or on the disk.

At block 127, display the item at the reference line. At block 128, display items surrounding the item displayed at the reference line, depending on the size of the display area.

The steps in FIGS. 9B, 9C and 9D starting with block 108 can be repeated at specific intervals. For example, every 30 seconds, the steps can be performed to update the display area and/or the indicator. These steps can also be performed substantially continuously, as well. Preferably, when the thumb position changes, the display of the list is updated and when the current position within a list changes or the contents of a list change, the thumb location is adjusted accordingly. Also, routines can be provided for software programs to update the display area and/or the indicator.

FIGS. 12–15 show more detailed alternative embodiments of the steps for determining minimum, maximum and current indicator values, performed at blocks 124 (FIG. 9B), 114 (FIG. 9C), and 126 (FIG. 9B). FIGS. 12A, 13A, 14A and 15A show alternative embodiments for block 124, while FIGS. 12B, 13B, 14B and 15B show alternative embodiments for blocks 114 and 126.

Figure 12A:
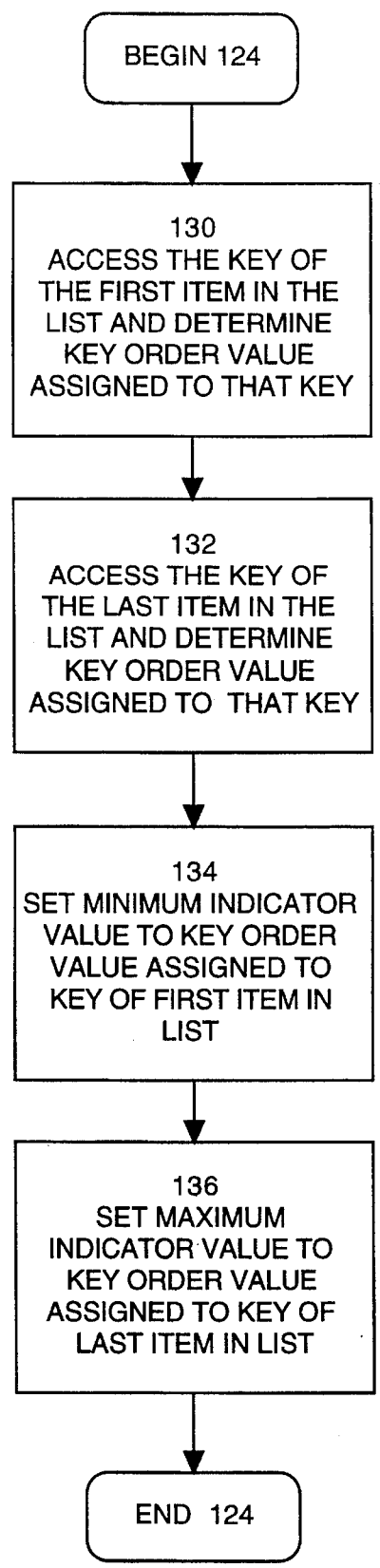
FIGS. 12A and 12B are flow charts of a first embodiment for determining a minimum and maximum indicator value and for determining a current indicator value, respectively.
Figure 12B:
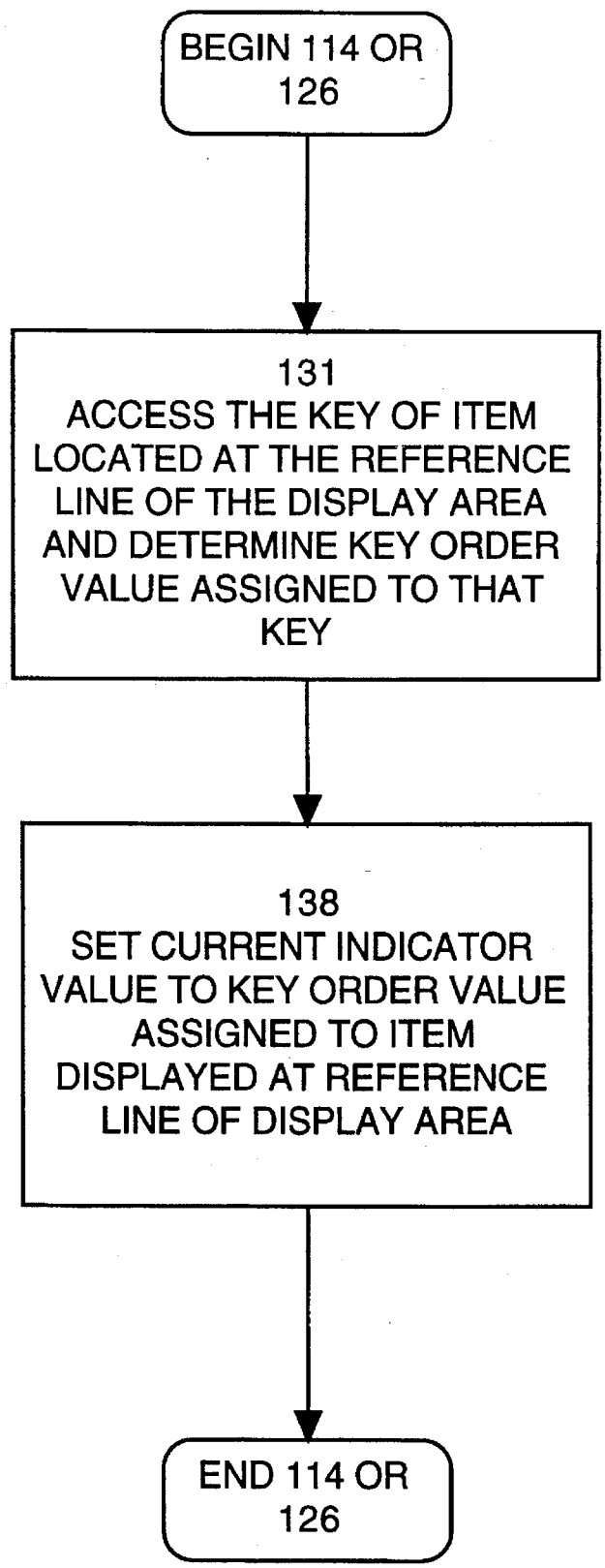

FIGS. 12A and 12B show a first embodiment. In FIG. 12A, at block 130, the key of the first item in the list is accessed and the key order value assigned to that key is determined. At block 132, the key of the last item in the list is accessed and the key order value assigned to that key is determined. At block 134, a minimum indicator value is set to the key order value assigned to the key of the first item in the list. At block 136, a maximum indicator value is set to the key order value assigned to the key of the last item in the list.

In FIG. 12B, at block 131, the key of the item at the reference line is accessed and the key order value assigned to that key is determined. At block 138, a current indicator value is set to the key order value assigned to the item displayed at the reference line of the display area. Blocks 130 through 136 can be performed in any order as long as block 130 precedes block 134, block 132 precedes block 136 and block 134 precedes block 138.

Figure 13A:
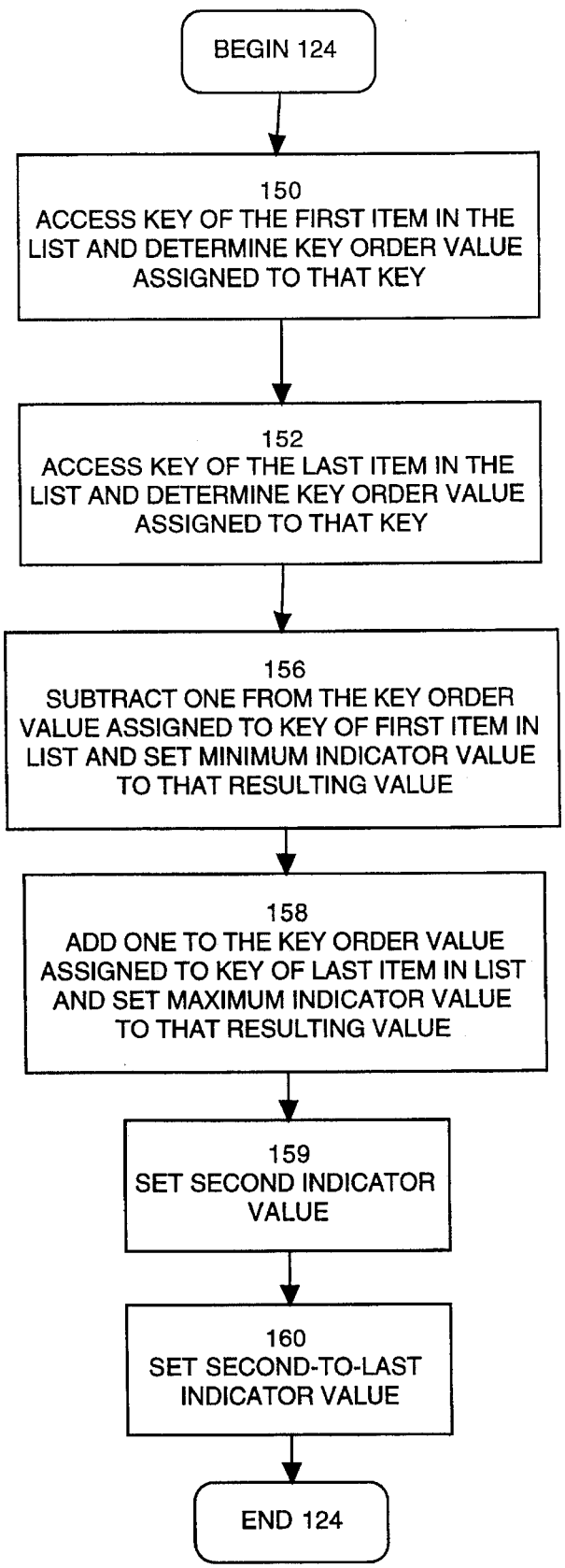
FIGS. 13A and 13B are flow charts of a second embodiment for determining a minimum and maximum indicator value and for determining a current indicator value, respectively.
Figure 13B:
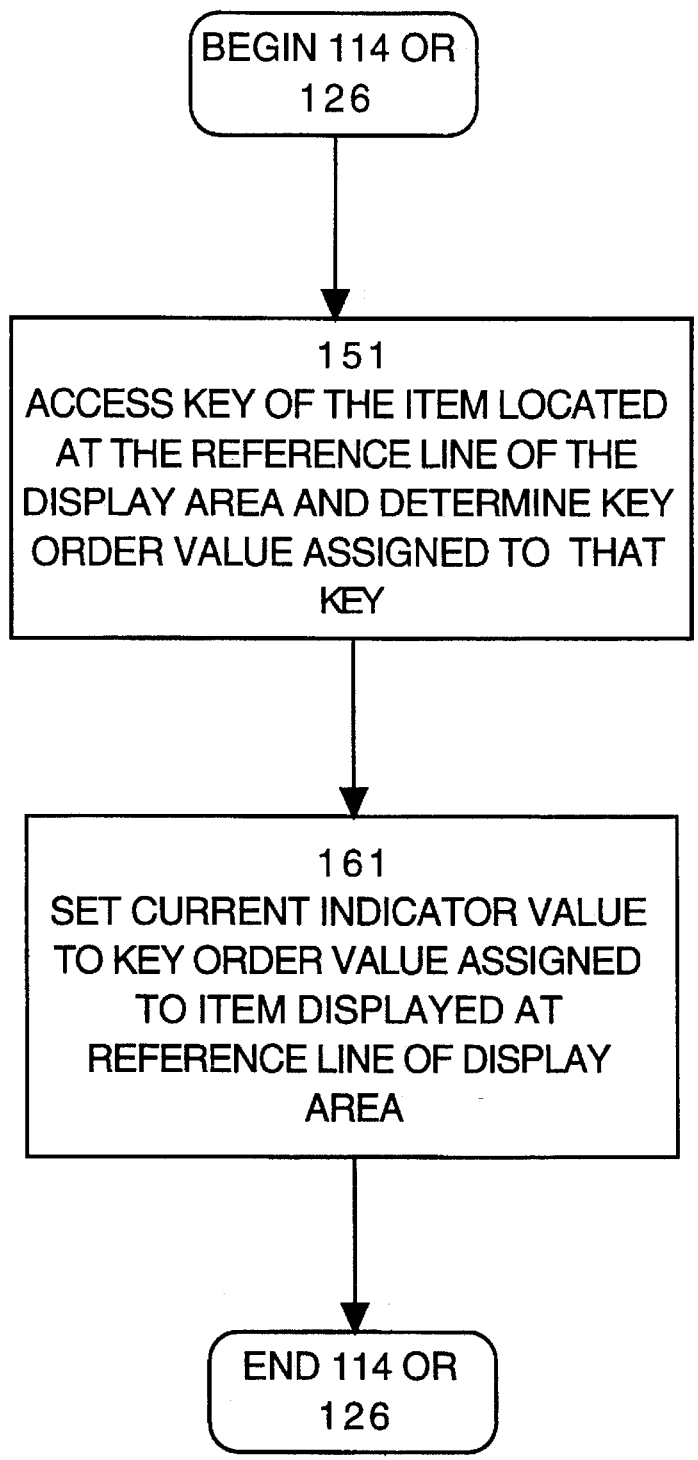

FIGS. 13A and 13B show a second embodiment similar to the first embodiment of FIGS. 12A and 12B, except that to provide better feedback of an indicator 34 at the top and the bottom of a list 24, the minimum and maximum indicator values are conceptually mapped to the top and bottom of the list. In FIG. 13A, at block 156, the key of the first item in the list is accessed and one is subtracted from the key order value assigned to that key and the minimum indicator value is set to that result. At block 158, the key of the last item in the list is accessed and one is added to the key order value assigned to that key and the maximum indicator value is set to that result.

At blocks 156 and 158 a number greater than one can also be used. Alternatively, minimum and maximum indicator values can be mapped to any arbitrary value which is not a legal key order value in the list. When an arbitrary value or a number greater than one is used, conventional error checking routines are preferably performed during searches for a particular indicator value, or in other words key order value, or key to handle a case where an invalid indicator value or key is specified.

For example the key order value of the first key is mapped to the second indicator value. Thus, the minimum indicator value is mapped to the second indicator value minus one. The key order value of the last key is mapped to the second-to-last indicator value. Thus, the maximum key order value is mapped to the bottom of the key order value of the last key plus one.

Mapping the minimum and maximum values of the scroll bar to a top and bottom of list respectively, also permits a user to access the top and bottom of a list in the situation where the number of entries in the list having the first or last key in the list exceeds the number of entries viewable in a window at a single time. For example, if the last key in the list is the letter "z" and there are twenty entries beginning with that key, but only 10 are viewable in a window at a single time, the first of those 10 would be viewable in the window. A user can then move the thumb to the bottom of thumb region to access the last 10 entries of the list. It also may give users a visible indication that they can not scroll any farther.

Preferably, one or more pixels at the top of a thumb region are reserved for the minimum indicator value and one or more pixels at the bottom of the thumb region are reserved for the maximum indicator value.

At block 159, the second indicator value is set and at block 160 the second-to-last indicator value is set. Preferably these values depend on the location of reference line 80 within the display area. The following discussion regarding blocks 159 and 160 is applicable to the embodiment in FIG. 12 if steps corresponding to blocks 159 and 160 are added thereto. If the reference line 80 is located at the first line in a display area, then a second value of an indicator, i.e. the indicator value immediately following the minimum indicator value, is set to the key order value assigned to the key of the first item in the list and a second-to-last value of an indicator, i.e. the indicator value immediately preceding the maximum indicator value, is set to the key order value assigned to the key of the last item in the list. Alternatively, the second-to-last indicator value is set to the key order value assigned to the key of the last-minus-nth item in the list, where "n" is the number of lines or vertical pixels in the display area. Depending on the information retrieval service used, if any, the key or grouping of the last-minus-nth item in the list is determined by enumerating the last n items in the list and then examining the last-minus-nth item.

For example, assume n equals 5, a list 24 has 10 items, a first item in a list has a key of "key1" which is assigned a key order value of 1 and the fifth item in the list has a key of "key5" which is assigned a key order value of 5. The minimum and maximum values of the indicator 34 are assigned to the top and bottom of the display area, respectively. The second value of the indicator is set to the key order value of the key of the first item in the list, in this case 1. The second-to-last value of the indicator is set to the key order value of the key of the last-minus-nth item, herein 5 since 10−5=5.

If at blocks 159 and 160, the reference line 80 is at or near the middle line in the display area 32, the value to which the second indicator value is set is determined by dividing n by 2, taking the floor or ceiling of the result, and adding 1 to the result, producing a "final result". The second indicator value is set to the key order value assigned to the key of the item located at the resulting line within the list, herein called the "final-result item". If an information retrieval service is being used, then depending on the capabilities of the service, the first item through the item at the location in the list specified by the final result above, the "final result item" are retrieved in order to determine the key or grouping corresponding to the final-result item.

The value to which the second-to-last indicator value is set is determined by enumerating from the end of the list a (final result+1) number of items in the list. The second-to-last indicator value is set to the key order value of the key of the item at the (last−final result+1) location in the list. This embodiment may improve the display of the thumb movement and the list in the window, but there may be more information retrievals performed than in other embodiments. Depending on the service used, if any, the key of the item at the (last−final result+1) location may be obtainable directly without enumerating from the end of the list.

If at blocks 159 and 160, the reference line 80 is at or near the bottom line in the display area 32, the second indicator value is set to the key order value assigned to the n+1th item in the list. Depending on the information retrieval service used, if any, the grouping or key of the item at the $n+1^{th}$ location in the list is determined by enumerating the first n+1 items in the list and examining the $n+1^{th}$ item. This embodiment may improve the display of the thumb movement and the list in the window, but there may be more information retrievals performed than in other embodiments. The second-to-last indicator value is set to the key order value of the last item in the list.

Even though some of the embodiments described above may include enumerating around the first and last entries by n or n/2 entries, the invention provides an advantage over prior systems when a list is long, because the entries preceding the approximate current position in the list do not have to be sequentially read into memory.

In FIG. 13B, at blocks 151 and 161, the key of the item located at the reference line in the display area is accessed and the current indicator value is set to the key order value assigned to that key.

Figure 14A:
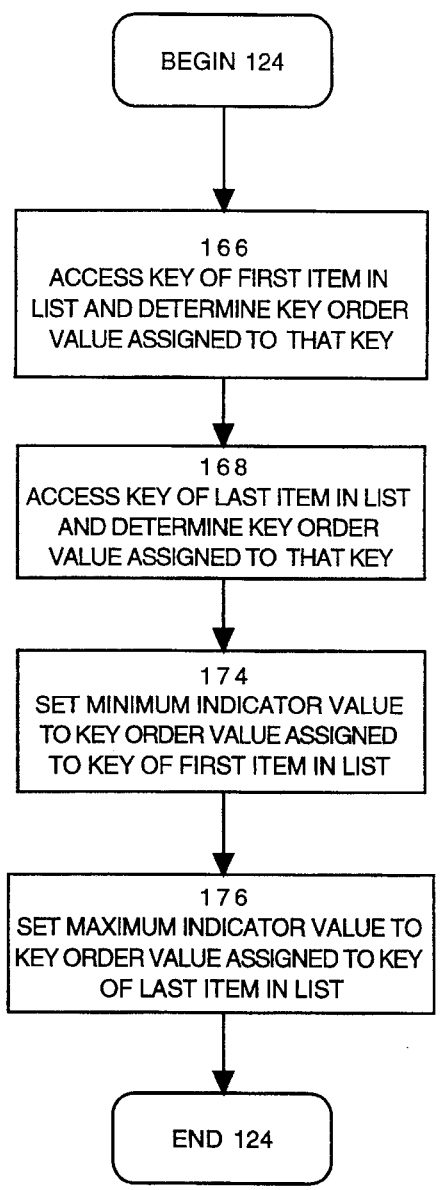
FIGS. 14A and 14B are flow charts of a third embodiment for determining a minimum and maximum indicator value and for determining a current indicator value, respectively.
Figure 14B:
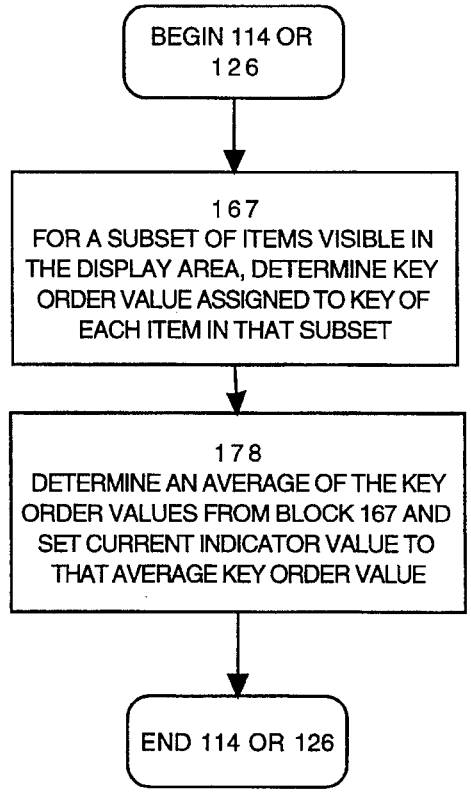

FIGS. 14A and 14B show a third embodiment which is similar to the steps shown in FIGS. 12A and 12B, except that interpolation is performed to determine the current indicator value. In FIG. 14B, at block 167, for a subset of items which are visible in the display area, the key order values assigned to those items are determined and at block 178 the current indicator value is set to the average of those key order values. Preferably, the subset of items is balanced about center line of the display area. For example, the subset could be comprised of the first and last line of the display area. In this case, the key order value assigned to the key of the item at the first line is added to the key order value assigned to the key of the item at the last line, the sum is divided by two and the indicator value is set to the result.

Figure 15A:
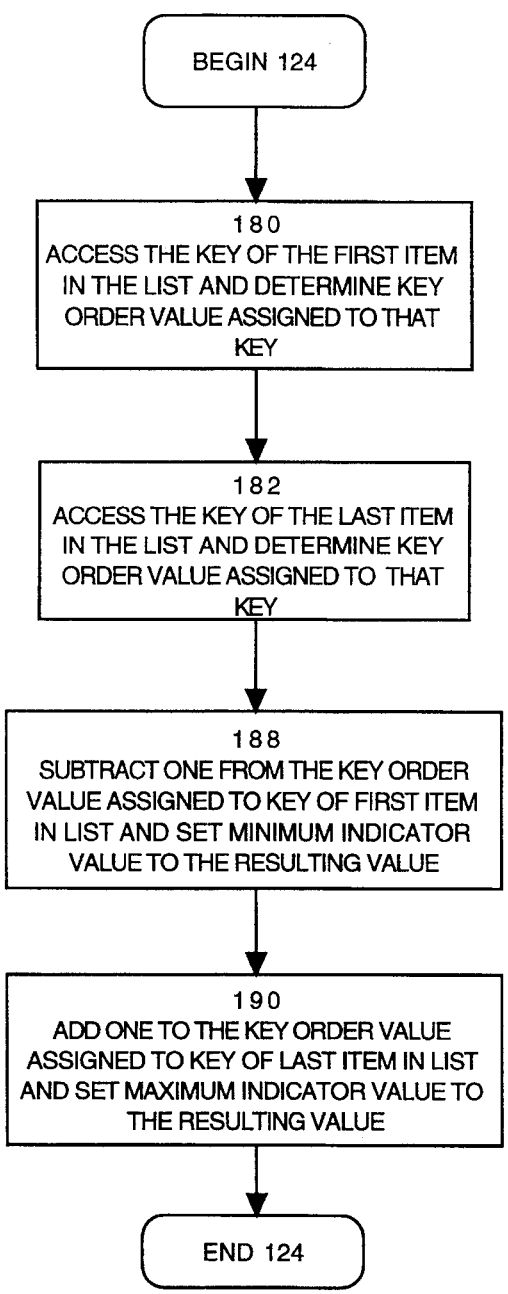
FIGS. 15A and 15B are flow charts of a fourth embodiment for determining a minimum and maximum indicator value and for determining a current indicator value, respectively.
Figure 15B:
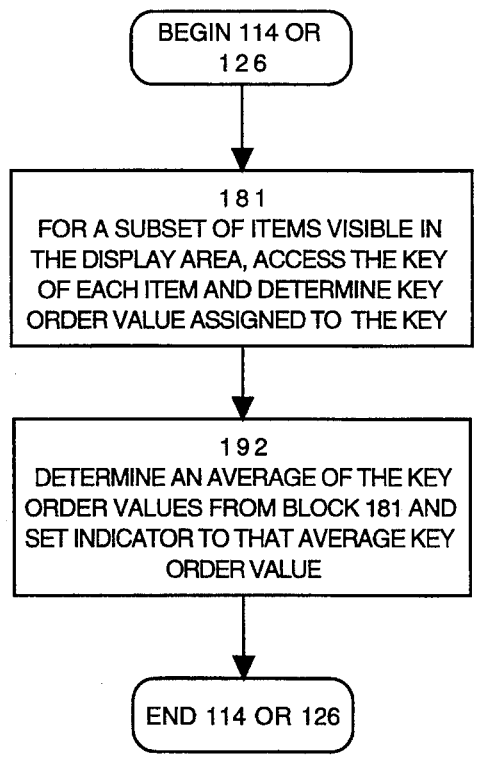

FIGS. 15A and 15B illustrate a fourth embodiment which is similar to the steps shown in FIGS. 14A and 14B, except that it incorporates the mapping of the minimum and maximum indicator values to the top and bottom of the display device, as well as setting the second and second-to-last indicator values, as described in conjunction with FIGS. 13A and 13B.

For a scroll bar, if a user moves a thumb to the top of the thumb region, then entries are enumerated in order beginning at the top of the list, regardless of where the reference line is within the window. If a user scrolls to the top of the list, then the thumb moves to the location within the thumb region associated with the top of the display area 32, preferably the top of a vertically-oriented thumb region and the left of a horizontally-oriented thumb region. If a user moves a thumb to the bottom of the thumb region, then entries are enumerated in reverse order beginning with the last entry in the list, regardless of where the reference line is within the window.

Figure 16:
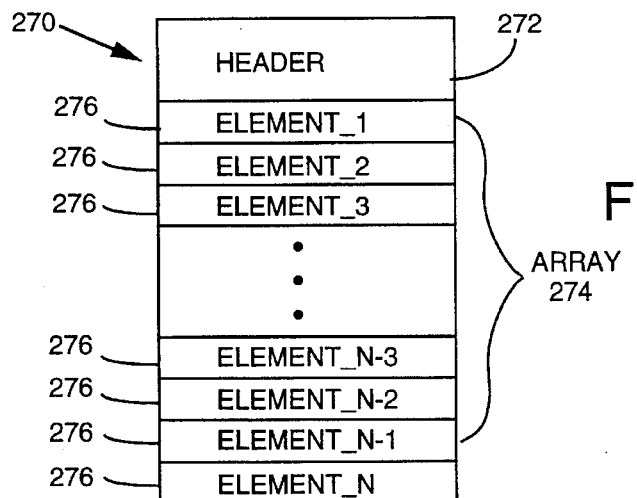
FIG. 16 illustrates a table.
Figure 17:
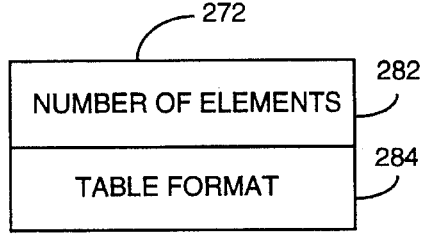
FIG. 17 illustrates a header of the table of FIG. 16.

FIG. 16 shows an example of a table 270 for storing information about the mapping of keys and groupings to key order values. The mapping information does not need to be stored in a table and can be algorithmically derived. As shown in FIG. 16, a table 270 preferably has a header 272 and an array 274 of elements 276. FIG. 17 shows the contents of a header 272 containing a number_of_elements field 282, and, preferably, a format field 284. The number_of_elements field 282, also known as a "second field", specifies the number of elements 126 in array 124.

The format field 284, also known as a "third field", specifies a format of the table 270. A first type of format for the table is called an "every key format". In that format each key is mapped to a key order value. More than one key can be mapped to the same key order value. For example, an upper-case "A" and a lower-case "a" can be mapped to the same indicator value. Preferably, the arrangement of the table 270 reflects the sorting criteria used to sort the list 24.

A second type of format for the table is called a "grouping format". In a table having a grouping format, the arrangement of the table 270 reflects the sorting criteria used to sort the list 24, i.e. the keys within the table are sorted according to the same criteria used to sort the list. Additionally, array 274 contains an element for a first key in each grouping, as well as for the key of the first item in the list, e.g. the first possible key mapping, if it is not already in the table.

For example, consider a list 24 of items 26 sorted according to keys which have been grouped into three groupings. The table in this case contains five elements. Two elements for the top and bottom of the display area and one element for each grouping. The ordering of the elements within the array 274 corresponds to the ordering of the groupings according to the sorting criteria used to sort the list. Also, the ordering of the keys within a grouping corresponds to the ordering of the keys according to the sorting criteria used to sort the list.

A table 270 may contain an element for each of a subset of keys. In essence, this is the same as the grouping format described above. Moreover, a table 270 may contain an element for each of a subset of groupings.

Figure 18:
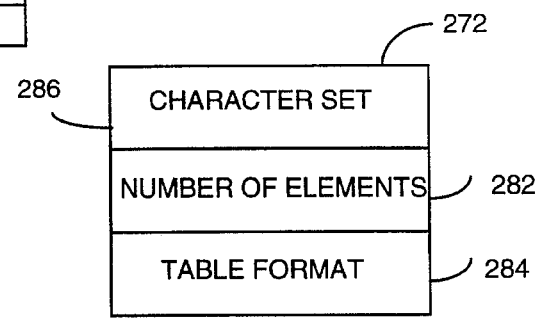
FIG. 18 shows a header of the table of FIG. 16 for a character set.
Figure 19:
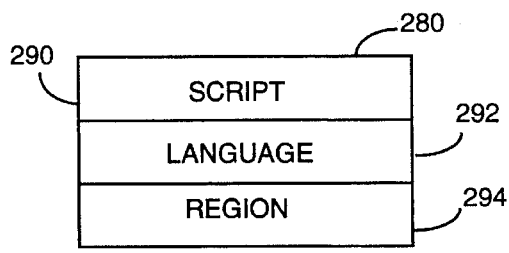
FIG. 19 shows a character set field of a header of FIG. 18.

FIG. 18 shows an example of a header 272 which can be used for keys and groupings which are based on a character set. In that case, the header 272 contains a character set field 286, also known as a "first field", describes the character set of the list. As shown in FIG. 19, this field may be divided into a script sub-field 290, a language sub-field 292 and a region sub-field 294. The script sub-field 290 specifies identifies the script of the items of the list, the language sub-field 292 specifies the language of those items and the region sub-field 294 specifies the region of those items.

Figure 20A:
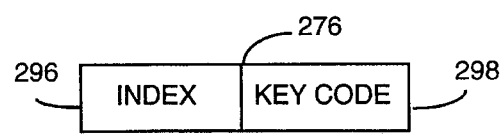
FIGS. 20A and 20B depict an element of an array of a table of FIG. 16 in every character format and grouping format, respectively.

An element 276 in array 274 describes a mapping between a key or grouping and a key order value. FIG. 20A shows an element 276 in array 274 in a table 270 having an every character format. An element 276 includes an index field 296 and a key code field 298.

An index field 296, also known as a "first element field", specifies a particular key order value. This value corresponds to a particular value of an indicator which corresponds to a location of an indicator, such as a thumb in a thumb region, or to a particular representation of an indicator, such as a percentage displayed in a percentile marker. Typically, a key order value is itself an indicator value.

A key code field 298, also known as a "second element field", specifies a code for a particular key 70 or a code for a first key in a grouping 76, depending on the format of the table 270. For example, where the keys used to sort a list are characters, the key code field may be equal to a character code for a particular character.

Figure 20B:
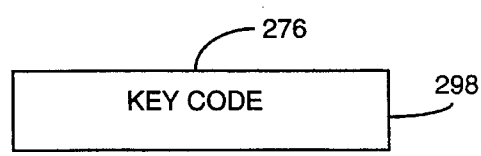

FIG. 20B shows an element 276 of array 274 in a table 270 having a group format. In that case, an element 276 contains a key code field 298, but not an index field 296. The indicator value, or in other words key order value, associated with a particular key code is derived from the location of the element within the array specifying the key code. In other words, given a key, the corresponding indicator value is derived from the location within the array of the element having that key code. Likewise, given an indicator value, it is used as an index into the array and the element at that index location contains the key code associated with that indicator value.

Using the table, given a particular key or grouping, depending on the format of the table 270, the key order value associated with that key or grouping can be accessed. Likewise, given a particular indicator value, the key or grouping associated with that value can be accessed, depending on the format of the table. Preferably, program routine calls, i.e. library calls, are provided to allow software programs other than the program generating the table 270 to access the information in the table.

The appendix contains a software code listing for, among other things, two such library routines which were developed for use with a Macintosh System 7 operating system. As shown in the appendix, a routine called "SLIndexToChar" returns a key associated with a given index. A routine called "SLGetControlValues" returns, among other information, a key order value associated with a given key. If the first and last keys which are visible in the window are provided as input to the routine and interpolation is requested, then the routine will interpolate in order to determine the indicator value. The SLGetControlValues routine also provides a mechanism for accessing the minimum and maximum indicator values, for obtaining the first and last keys used in the list and for determining whether the first or last elements in the list are visible in the window. This functionality could alternatively be provided in one or more separate routines. Preferably, the first and last keys in the list are determined when the list changes.

Figure 21:
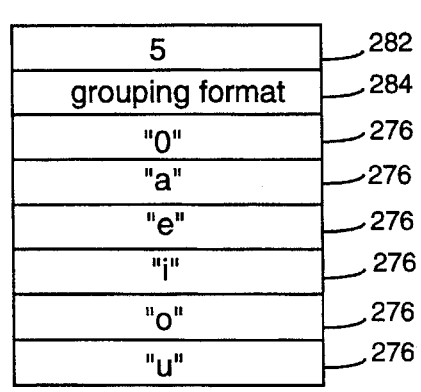
FIG. 21 is an example of a table of FIG. 16 having a "grouping" format.

FIG. 21 illustrates conceptually an example of a table 270 having a grouping format. During a search for an indicator value, given a particular key, in a table having this format, if the key itself is not specified by an element in the table, then the indicator value corresponding to the key which sorts closest to and less than the given key, i.e. preceding the given key according to the sort criteria used to sort the list, is returned as the result of the search.

In the example of FIG. 21, the table 270 contains an entry for the first possible key mapping, an ascii code zero, and for each of the vowels "a", "e","i", "o" and "u". If the table 270 is being searched for the indicator value corresponding to the key "b", then the location of the element specifying the key "a" is returned as the indicator value resulting from the search. If the range of the indicator values were 0 through 5 and the ascii code zero was specified by an element in position 0 of the array and the letter "a" was specified by an element in position 1 of the array, then the indicator value of 1 would be returned as a result of the search.

In an alternative embodiment of a table 270 having a "grouping format" when a given key is not found during a search the key order value corresponding to the key or key order value which is closest to and greater than, i.e. following the given key according to the sort criteria used to sort the list, the given key is returned as the result of the search. This key order value is the indicator value. Similar actions occur during a search for a key corresponding to a given indicator value.

Figure 22:
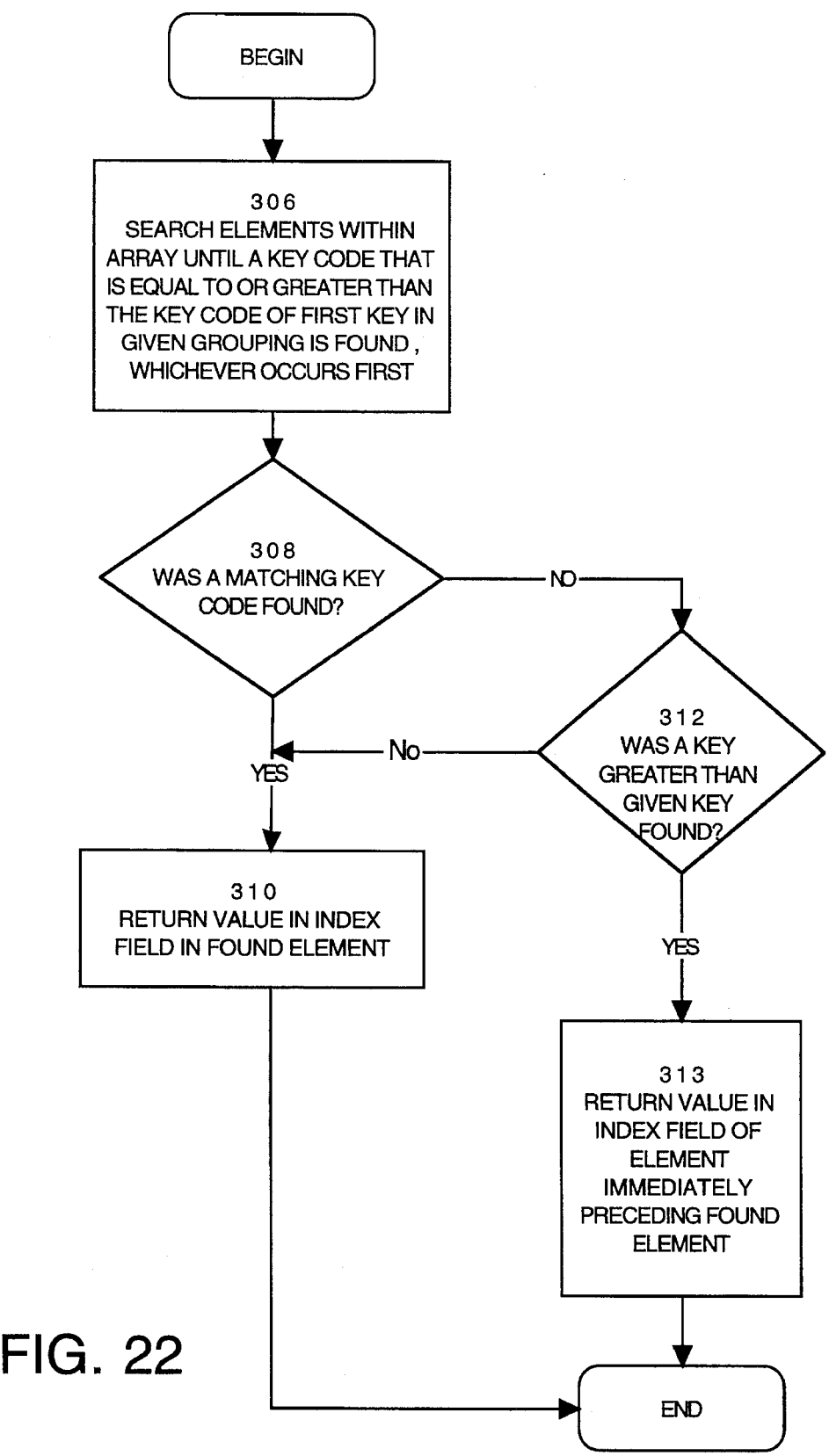
FIG. 22 is a flow chart of the steps for accessing an indicator value within a table of FIG. 16 given a particular key or grouping.
Figure 23:
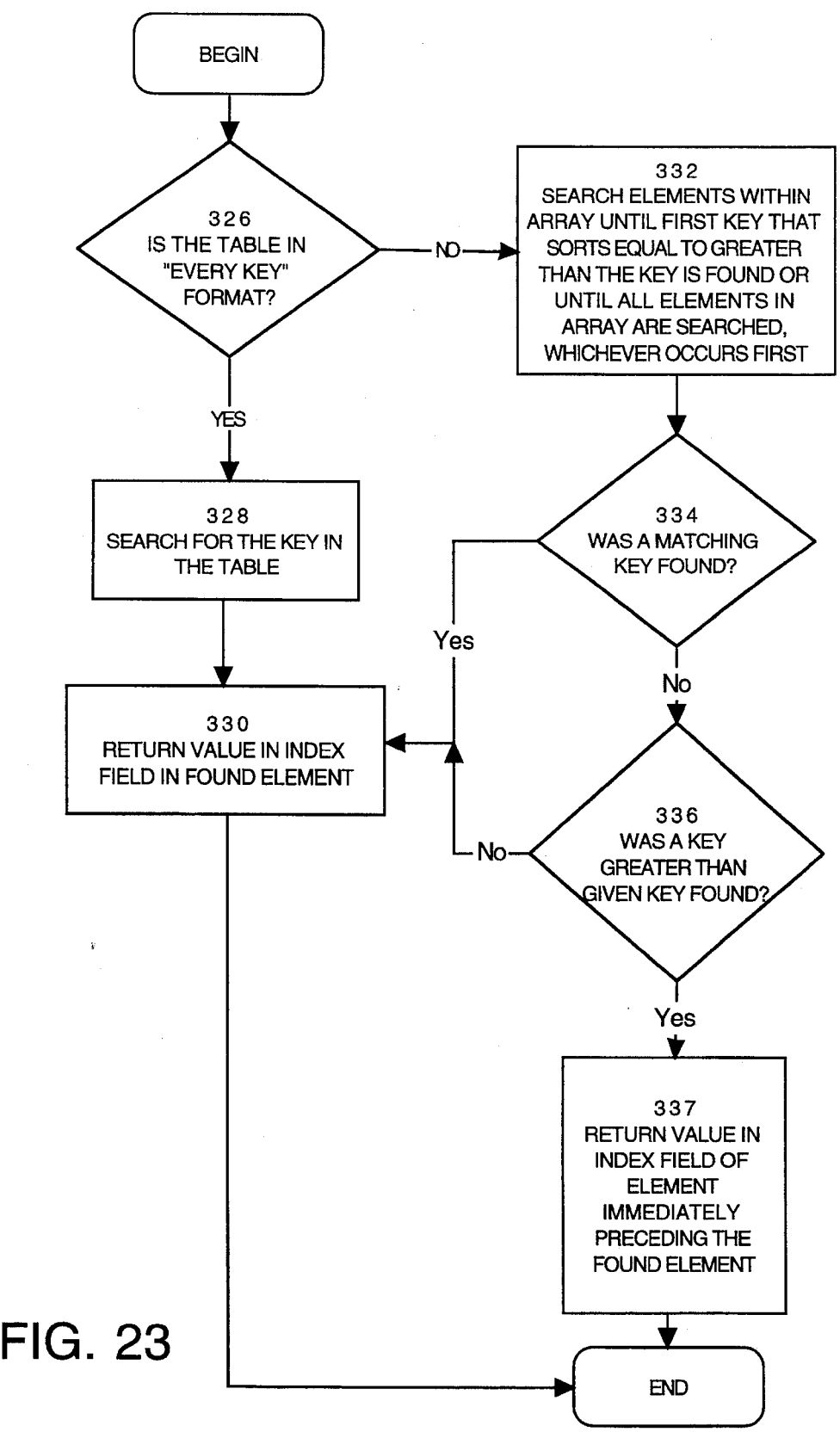
FIG. 23 is a flowchart showing an alternative group of steps for accessing an indicator value within a table of FIG. 16 given a particular key or grouping.

FIGS. 22–23 illustrate how to use a table 270 to access an indicator value for a particular key by looking up the key order value associated with that key or grouping in the table. The key order value found in the table is the indicator value for the given key. The steps in FIG. 22 or FIG. 23 can be used in FIG. 9C at block 114 and the more detailed Figs. of block 114 to determine key order values for a key.

Figure 24:
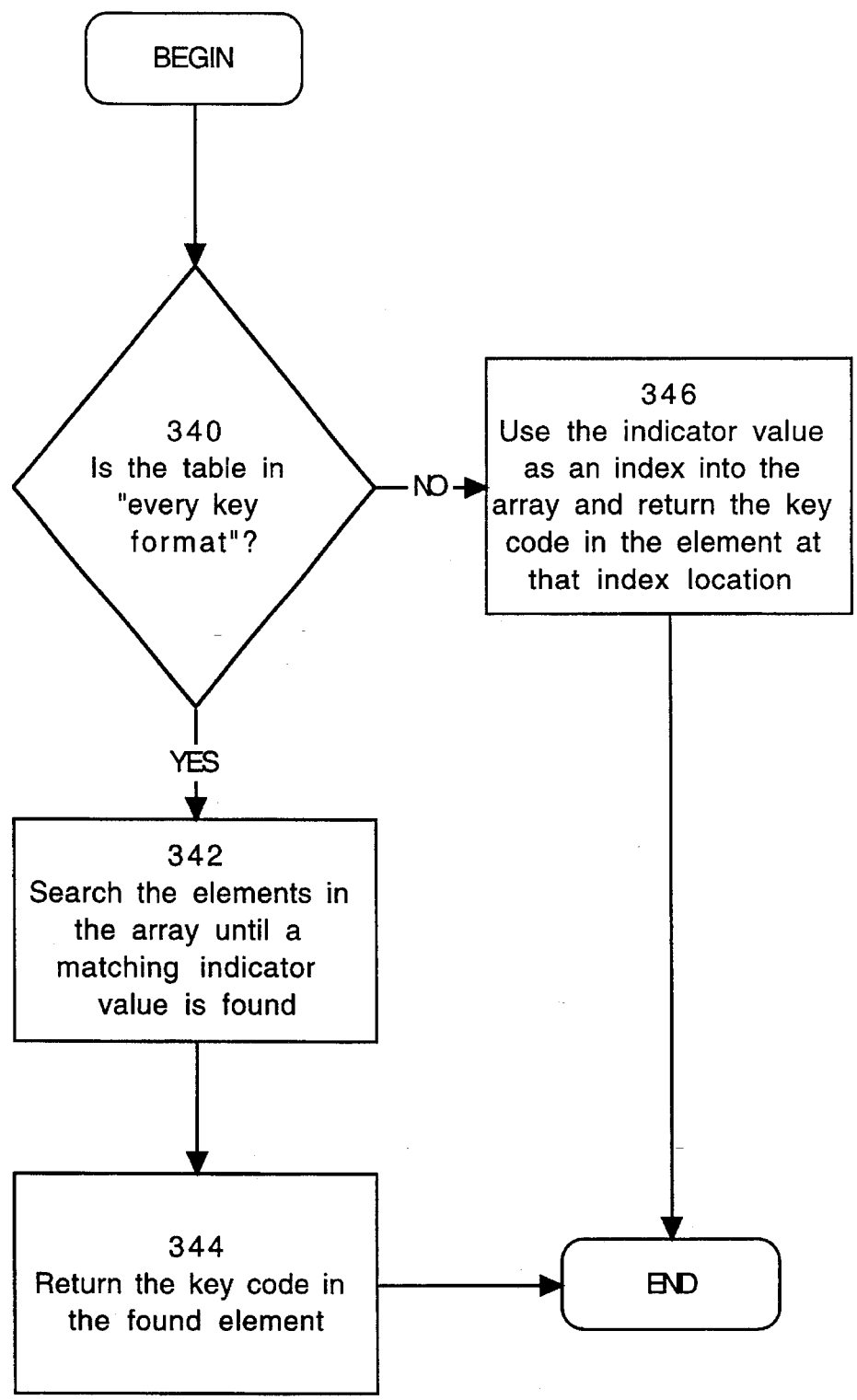
FIG. 24 is a flowchart depicting the steps for accessing a key in a table of FIG. 16 given a particular indicator value.

FIG. 24 illustrates how to use a table 270 to access a key for a given a particular indicator value, i.e. key order value, by looking up the key associated with that value in the table. The steps in FIG. 24 can be used at block 117 of FIG. 9D to determine a key corresponding to an indicator value.

FIG. 22 is a flowchart showing how to access an key order value, i.e. indicator value, associated with a particular given key in a table having an arrangement which reflects the sorting criteria used to sort the list 24. At block 306, scan elements within the array 274, until a key code matching the key code of the given key is found, or until a key code which follows the sought after key code in the sort criteria of the list is found, or until all elements in the array have been searched, whichever occurs first. The element on which the search stops is called a "found element".

At decision block 308, determine whether a matching key code was found. If so, then at block 310 return the value in the index field in the found element. Otherwise, at decision block 312, if a key code greater than the given key code was found, then at block 313 return the value in the index field of the element immediately preceding the found element in the table. Otherwise, at block 310 return the value in the index field in the found element.

FIG. 23 is a flowchart similar to FIG. 24 to access an indicator value, given a particular key or grouping, from a table which, depending on the format, may or may not be arranged in such a way to reflect the sort criteria used to sort the list 24. For example, the elements in an array in a table having an every key format may be unsorted, but in a table having a grouping format, the elements are sorted.

At decision block 326, determine whether the table is in "every key format". If so, then at block 328, search the elements in the array until a matching key code is found. At block 330, return the value in the index field of the element found in the search, e.g. the one specifying the matching key code. Conventional error checking routines can be used to determine whether the given key code is valid or to check whether a matching key code was found.

Otherwise, if the table is not in "every key format" then at block 332, search the elements within the array until a key code matching the key code of the given key or grouping is found or until a key code which follows the sought after key code in the sort criteria of the list is found or until all elements in the array have been searched, whichever occurs first. If it is determined at block 334 that a matching key was found, then at block 330, return the value in the index field of the element found in the search. Otherwise, at block 336 if a matching key code was not found, but a key code greater than the given key code was found, then at block 337 return the value in the index field of the element immediately preceding the found element. Otherwise, if a key code greater than the given key code was not found and a matching key code was not found, then at block 330, return the value in the index field of the element found in the search.

FIG. 24 is a flowchart depicting the steps for using a table to access a key, or a first key within a grouping, associated wit a particular indicator value. At decision block 340, determine whether the table is in "every key format". If so, then at block 342, search the elements in the array until a matching indicator value is found. At block 344, return the key code in the found element.

If at block 340, the table is not in "every key format", then at block 346 use the given indicator value as an index into the array in the table and return the key code in the element at that index location.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

PATENTS
04860.P937

APPENDIX

```
/*
    File:       Scrollocalization.c

Contains:   Source to Large Directory Scroll Bar Solution

Copyright:  © 1992, 1993 by Apple Computer, Inc., all rights reserved.
*/

/*-----------------------------------------------------------------
-------------------
    Scrollocalization works with two table formats.  The first table format is the
    preferred table format which is the Every Character Table Format. The second format
    is the Some Character Table Format.  The two tables begin with an identical header
    that gives necessary information about the table.  They differ in the array of
    elements that follow the header.  For each table format there are two routines
    that access the table.  IndexToCharacter and CharacterToIndex. Each table provides
    two longs to hold the address of the routines that perform these functions.  This
    along with the macros make our tables into objects with virtual functions in a sense.

The advantage with the EC format is that characters that have the same primary
    sorting, are given the same index.  The disadvantage is that the SLTable is larger.
    The EC format can be generated programatically quite easily.

The advantage with the SC format is that the table is small.  The disadvantage is
    that performing the CharacterToIndex may be a slower operation since it must use
    OCEReIRString to determine the index, while IndexToCharacter will be fast.

All character values are represented in 2 byte spaces.   A character that is 1 byte
    is represented in the high byte of the word, with the low byte set to 0.
------------------------------------------------------------------
-------------------*/ define __Scrollocalization(count,selector)

ifndef __LIMITS__
#include <Limits.h>
endif ifndef __RESOURCES__
include <Resources.h>
#endif
```

PATENTS
04860.P937

```
#ifndef __ERRORS__
#include <Errors.h>
endif ifndef __OCE__
include <OCE.h>
endif ifndef __SCRIPT__
include <Script.h>
endif ifndef __OCEAUTHDIR__
include <OCEAuthDir.h>
endif include "Scrollocalization.h"

define TableFormatEveryCharacter 1
define TableFormatSomeCharacters 2 typedef struct
{
        RStringHeader
        short theChar;
}MyRChar;

typedef short (*IndexToCharacterRtn)(struct SLTable *theTable,short index);
typedef unsigned short (*CharacterToIndexRtn)(struct SLTable *theTable,const MyRChar *theChar);

/*-------------------------------------------------------------
-----------------------
        If every element is present we allow many character to 1 index.  That is why we
        require each index and character in the table.

If the table is of type TableFormatSomeCharacters, then many characters to a single
        index must exist.  The index is based upon the array index in this case, so it is
        not needed.  This also helps to keep the table small.
---------------------------------------------------------------
---------------------*/ typedef struct
{
        unsigned short index;
        short   theChar;
}indexCharElement;
```

PATENTS
04860.P937

```
typedef struct SLTable
{
        IndexToCharacterRtn  indexToChar;
        CharacterToIndexRtn  charToIndex;
        SLRV                 slrv;
        short                tableFormat;
        long                 length;         /* length in elements, not bytes */
        indexCharElement     indexChar[0];   /* Every Character Format. */
        short                theChar[0];     /* Some character format. */
}SLTable;

#define CharacterToIndex(theTable,theChar)    (*(theTable)-
>charToIndex)(theTable,theChar)
#define IndexToCharacter(theTable,index) (*(theTable)->indexToChar)(theTable,index)

#define kScrollocalizationTableResType      'slzt'
#define kScrollocalizationTableID    -1
```

/*------------------------------------------------------------
----------------------
        Prototypes.
------------------------------------------------------------
-------------------*/

```
static OSErr GetSLTable(SLTable ***theTable);
static short SC_IndexToCharacter(SLTable *theTable,short index);
static unsigned short SC_CharacterToIndex(SLTable *theTable,const MyRChar *rChar);
static short EC_IndexToCharacter(SLTable *theTable,short index);
short MyCharByte(CharacterSet charSet,Ptr textBuf,short textOffset);
static unsigned short EC_CharacterToIndex(SLTable *theTable,const MyRChar *rChar);
pascal OSErr SLIndexToRChar(short index,RChar *theRChar);
pascal OSErr SLGetControlValues(const RChar *firstRChar,
                                            const RChar *lastRChar,
                                            const RChar *midVisibleRChar,
                                            const RChar *firstVisibleRChar,
                                            const RChar *lastVisibleRChar,
                                            Boolean interpolate,
                                            Boolean firstElementIsVisible,
                                            Boolean lastElementIsVisible,
                                            short *value,
                                            short *min,
                                            short *max);
```

/*------------------------------------------------------------
----------------------
        GetSLTable is a utility that reads the SLTable into memory.  The SLTable should be
        a System,purgeable resource.
------------------------------------------------------------
-------------------*/
static OSErr GetSLTable(SLTable ***theTable)

PATENTS
04860.P937

```
{
        OSErr result;
        SLTable *aTable;

*theTable = (SLTable
**)GetResource(kScrollocalizationTableResType,kScrollocalizationTableID);
        result = *theTable?ResError():memFullErr;
        if(!result)
        {
                aTable = **theTable;

if(aTable->tableFormat == TableFormatEveryCharacter)
                {
                        aTable->indexToChar = EC_IndexToCharacter;
                        aTable->charToIndex = EC_CharacterToIndex;
                }
                else
                {
                        aTable->indexToChar = SC_IndexToCharacter;
                        aTable->charToIndex = SC_CharacterToIndex;
                }
        }
        return(result);
}

/*---------------------------------------------------------
-------------------
        SC_IndexToCharacter returns the index.
---------------------------------------------------------
-------------------*/
static short SC_IndexToCharacter(SLTable *theTable,short index)
{
        return(theTable->theChar[index]);
}

/*---------------------------------------------------------
-------------------
        SC_CharacterToIndex returns the character based upon an index.
---------------------------------------------------------
-------------------*/
static unsigned short SC_CharacterToIndex(SLTable *theTable,const MyRChar *rChar)
{
        short *indexChar, *endOfTable;
        MyRChar theRChar;
        unsigned short index;

endOfTable = &theTable->theChar[theTable->length+1];
        for(index = 0,indexChar = &theTable->theChar[1];indexChar <
endOfTable;++index,++indexChar)
```

```
        {
                short charType;

theRChar.theChar = *indexChar;
                theRChar.charSet = theTable->slrv.script;
                charType = MyCharByte(theRChar.charSet,(Ptr)&theRChar.theChar,0);
                theRChar.dataLength = (charType == 0)?1:2;

if(OCERelRString((RStringPtr)rChar,(RStringPtr)&theRChar,kOCERecordOrDNodeName) <
0)
                {
                        break;
                }
        }
        return(index);
}

/*-----------------------------------------------------
----------------------
        EC_IndexToCharacter returns the index.
-------------------------------------------------------
--------------------*/
static short EC_IndexToCharacter(SLTable *theTable,short index)
{
        indexCharElement *indexChar, *endOfTable;

endOfTable = &theTable->indexChar[theTable->length+1];
        for(indexChar = theTable->indexChar;indexChar < endOfTable;++indexChar)
        {
                if(indexChar->index == index)
                {
                        return(indexChar->theChar);
                }
        }
}

/*-----------------------------------------------------
----------------------
        MyCharByte is similar to CharByte except that it takes an additional parameter
        charSet to ensure that everything is correct.
-------------------------------------------------------
--------------------*/
static short MyCharByte(CharacterSet charSet,Ptr textBuf,short textOffset)
{
        GrafPtr thePort;
        short currentFont;
        short scriptSysFont;
        short result;
```

```
        GetPort(&thePort);
// Get the current grafport.
        currentFont = thePort->txFont;                          // Remember what font is in use.
        scriptSysFont = GetScript(charSet,smScriptSysFond);     // Get a font in this script.
        TextFont(scriptSysFont);                                // Change the font.
        result = CharByte(textBuf,textOffset);                  // Make the script manager call
        TextFont(currentFont);                                  // Reset the font to what it was
        return(result);                                         // Return the truth.
}

/*-----------------------------------------------------------------------------
        EC_CharacterToIndex returns the character based upon an index.
-------------------------------------------------------------------------*/
static unsigned short EC_CharacterToIndex(SLTable *theTable,const MyRChar *rChar)
{
        indexCharElement *indexChar, *endOfTable;
        short charType;

endOfTable = &theTable->indexChar[theTable->length+1];
        charType = MyCharByte(rChar->charSet,(Ptr)&rChar->theChar,0);
#ifdef DEBUG
        if(charType > 0)
        {
                Debugger();
        }
endif for(indexChar = theTable->indexChar;indexChar < endOfTable;++indexChar)
        {
                if(charType)    // if its a double byte character?
                {
                        if(indexChar->theChar == rChar->theChar)
                        {
                                return(indexChar->index);
                        }
                }
                else    // It is a single byte character.
                {
                        if(*(char *)&indexChar->theChar == *(char *)&rChar->theChar)
                        {
                                return(indexChar->index);
                        }
                }
```

PATENTS
04860.P937

```
        }
}

/*------------------------------------------------------------
   ----------------------
        SLIndexToRChar is designed to help figure out where to begin enumeration when
        the user has moved the thumb.

If the scroll bar has been set up using SLGetControlValues, then passing in the
        control's value after the client has positioned it will return the appropriate
        RChar to use for which enumeration should be performed around.
   ------------------------------------------------------------
   ----------------*/
pascal OSErr SLIndexToRChar(short index,RChar *theRChar)
MyRChar *theRChar;
{
        SLTable **theTable;
        OSErr result;
        short charType;

result = GetSLTable(&theTable);
        if(!result)
        {
                HLock((Handle)theTable);

theRChar->theChar = IndexToCharacter(*theTable,index);
                theRChar->charSet = (**theTable).slrv.script;
                HUnlock((Handle)theTable);
        }
        charType = MyCharByte(theRChar->charSet,(Ptr)&theRChar->theChar,0);
        theRChar->dataLength = (charType == 0)?1:2;
        return(result);
}

/*------------------------------------------------------------
   ----------------------
        SLGetControlValues provides the value, min and max for a scroll bar based upon
        the firstRChar and lastRChar in the entire list, and the firstVisibleRChar and
        lastVisibleRChar being displayed.

For any of the RChar's you may pass in an RString, only the first character is
        examined.

firstRChar and lastRChar may be NULL, in which case it is interpreted to mean that
        the first and last characters in our table is used.

midVisibleRChar indicates what is currently in the middle of your list.

firstVisibleRChar, and lastVisibleRChar are optional, if they are provided and
```

PATENTS
04860.P937 interpolate is set to true, a more acurate scroll bar may be achieved. However, if the user has just moved the thumb, and you called SLIndexToRChar and then performed the enumeration about the RChar you will want to pass false in for the interpolate parameter, otherwise the thumb may move slightly from where the user had placed it.

firstElementIsVisible indicates that the first element in the list is visible.
lastElementIsVisible indicates that the last element in the list is visible.

NOTE: If all elements for the list are in memory, you should calculate these values in the usual way.
------------------------------------------------------------
-------------------*/

```
pascal OSErr SLGetControlValues(const RChar *firstRChar,
                                const RChar *lastRChar,
                                const RChar *midVisibleRChar,
                                const RChar *firstVisibleRChar,
                                const RChar *lastVisibleRChar,
                                Boolean interpolate,
                                Boolean firstElementIsVisible,
                                Boolean lastElementIsVisible,
                                short *value,
                                short *min,
                                short *max)
const MyRChar *firstRChar;
const MyRChar *lastRChar;
const MyRChar *midVisibleRChar;
const MyRChar *firstVisibleRChar;
const MyRChar *lastVisibleRChar;
{
        SLTable **hTable,*theTable;
        OSErr result;

result = GetSLTable(&hTable);
        if(!result)
        {
                HLock((Handle)hTable);
                theTable = *hTable;
                *min = CharacterToIndex(theTable,firstRChar);
                *max = CharacterToIndex(theTable,lastRChar);

if(firstElementIsVisible)
                {
                        *value = *min;
                }
                else if(lastElementIsVisible)
                {
                        *value = *max;
```

PATENTS
04860.P937

```
            }
            else if(interpolate) // Somewhere in the middle
            {
                    long iValue;    // Use long to prevent overflow.

iValue = CharacterToIndex(theTable,firstVisibleRChar);
                    iValue += CharacterToIndex(theTable,lastVisibleRChar);
                    iValue += CharacterToIndex(theTable,midVisibleRChar);
                    *value = iValue/3;
            }
            else // Somewhere in the middle
            {
                    *value = CharacterToIndex(theTable,midVisibleRChar);
            }
            HUnlock((Handle)hTable);
        }
        return(result);
}

/*-------------------------------------------------------------
-----------------------
        SLGetTableSLRV returns the slrv for our localized table.
-------------------------------------------------------------
----------------------*/
pascal OSErr SLGetTableSLRV(SLRV *slrv)
{
        SLTable **hTable;
        OSErr result;

result = GetSLTable(&hTable);
        if(!result)
        {
                *slrv = (**hTable).slrv;
        }
        return(result);
}

/*
        File:      Scrollocalization.h

Copyright: © 1992, 1993 by Apple Computer, Inc., all rights reserved.
*/ ifndef __SCROLLOCALIZATION__
define __SCROLLOCALIZATION__ ifndef __OCE__
```

PATENTS
04860.P937

```
#include <OCE.h>
endif ifndef __OCEAUTHDIR__
include <OCEAuthDir.h>
endif ifndef __Scrollocalization
define __Scrollocalization(count,selector) = { 0x203C,count,selector, 0xAA5D}
endif define kSLIndexToRChar 3300
define kSLGetControlValues 3301
define kSLGetTableSLRV 3302 define kRCharMaxBytes 2 typedef struct RChar
{
        RStringHeader
        Byte body[kRCharMaxBytes];
};

typedef struct RChar RChar;
```

/*----------------------------------------------------------
-------------------

SLIndexToRChar is designed to help figure out where to begin enumeration when
    the user has moved the thumb.

If the scroll bar has been set up using SLGetControlValues, then passing in the
    control's value after the client has positioned it will return the appropriate
    RChar to use for which enumeration should be performed around.
----------------------------------------------------------
-------------------*/

```
pascal OSErr SLIndexToRChar(short index,RChar *theRChar)
        __Scrollocalization(3,kSLIndexToRChar);
```

/*----------------------------------------------------------
---------------------

SLGetControlValues provides the value, min and max for a scroll bar based upon
    the firstRChar and lastRChar in the entire list, and the firstVisibleRChar and
    lastVisibleRChar being displayed.

For any of the RChar's you may pass in an RString, only the first character is
    examined.

33

PATENTS
04860.P937 firstRChar and lastRChar may be NULL, in which case it is interpreted to mean that the first and last characters in our table is used.

midVisibleRChar indicates what is currently in the middle of your list.

firstVisibleRChar, and lastVisibleRChar are optional, if they are provided and interpolate is set to true, a more acurate scroll bar may be achieved. However, if the user has just moved the thumb, and you called SLIndexToRChar and then performed the enumeration about the RChar you will want to pass false in for the interpolate parameter, otherwise the thumb may move slightly from where the user had placed it.

firstElementIsVisible indicates that the first element in the list is visible.
lastElementIsVisible indicates that the last element in the list is visible.

NOTE: If all elements for the list are in memory, you should calculate these values in the usual way.
--------------------------------------------------------------------
----------------------*/

```
pascal OSErr SLGetControlValues(const RChar *firstRChar,
                                const RChar *lastRChar,
                                const RChar *midVisibleRChar,
                                const RChar *firstVisibleRChar,
                                const RChar *lastVisibleRChar,
                                Boolean interpolate,
                                Boolean firstElementIsVisible,
                                Boolean lastElementIsVisible,
                                short *value,
                                short *min,
                                short *max)
        __Scrollocalization(19,kSLGetControlValues);

/*------------------------------------------------------------------
----------------------
        SLGetTableSLRV returns the SLRV of the scrollocalization table.
--------------------------------------------------------------------
----------------------*/
pascal OSErr SLGetTableSLRV(SLRV *slrv)
        __Scrollocalization(2,kSLGetTableSLRV);

#endif
```

We claim:

1. A method for displaying on a display area of a computer display device both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

accessing a key of a first item in a list;

accessing a key of a last item in a list;

mapping the key of the first item in the list to a key order value;

mapping the key of the last item in the list to a key order value which is equal to or greater than the key order value mapped with the first key;

determining a range of indicator values, the range including the key order value mapped to the first key in the list, the key order value mapped to the last key in the list and the indicator values between them; and mapping a key of a displayed item in the list to an indicator value.

2. A method defined in claim 1 further comprising the steps of:

mapping the top of the list to an indicator value which is less than or equal to the key order value mapped with the key of the first item in the list; and mapping the bottom of the list to an indicator value which is greater than or equal to the key order value mapped with the key of the last item in the list.

3. A method for displaying on a display area of a computer display device both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

accessing a key of a first item in a list;

accessing a key of a last item in a list;

mapping the key of the first item in the list to an indicator value;

mapping the key of the last item in the list to an indicator value which is equal to or greater than the indicator value mapped with the first key;

determining a range of indicator values, the range including the key order value mapped to the first key in the list, the key order value mapped to the last key in the list and the indicator values between them;

mapping an indicator value to a specific key; and displaying items within the list based upon the specific key.

4. A method defined in claim 3 further comprising the steps of:

mapping the top of the list to an indicator value which is less than or equal to the key order value mapped with the key of the first item in the list; and mapping the bottom of the list to an indicator value which is greater than or equal to the key order value mapped with the key of the last item in the list.

5. A method for displaying on a computer display device both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

determining a range of values for the indicator;

mapping each key to a value of the indicator within the range;

storing information about the mapping in a table;

specifying a key;

searching the table for an indicator value corresponding to the specified key; and displaying the indicator based on that indicator value.

6. A method for displaying on a computer display device both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

determining a range of values for the indicator;

mapping each key to a value of the indicator within the range;

storing information about the mapping in a table;

specifying an indicator value;

searching the table for a key corresponding to the specified indicator value; and displaying items in the list based upon the specific key.

7. A method for displaying on a computer display device both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

forming a plurality of groupings of keys, each grouping having at least one key such that each key belongs to only one grouping;

determining a range of values for the indicator;

mapping groupings to values of the indicator within the range;

storing information about the mapping in a table;

specifying a grouping; and searching the table for an indicator value corresponding to the specified grouping.

8. A method as defined in claim 7 wherein the groupings are based upon the statistical probability of occurrence of the keys in the groupings.

9. A method for displaying on a computer display device both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

forming a plurality of groupings of keys, each grouping having at least one key such that each key belongs to only one grouping;

determining a range of values for the indicator;

mapping groupings to values of the indicator within the range;

storing information about the mapping in a table;

specifying an indicator value; and searching the table for a grouping corresponding to the specified indicator value.

10. A method as defined in claim 9 wherein the groupings are formed to substantially equalize the statistical probability of occurrence of each grouping.

11. A method for displaying on a computer display device both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device having a display area, said method comprising the steps of:

sorting keys;

assigning non-decreasing key order values to the sorted keys in order;

selecting a reference line within the display area;

setting a minimum indicator value to the key order value assigned to the key of the first item in the list;

setting a maximum indicator value to the key order value assigned to the key of the last item in the list;

setting a current indicator value to the key order value assigned to the key of the item being displayed at the reference line; and displaying the indicator according to a value associated with a key of an item being displayed.

12. A method as defined in claim 11 wherein assigning non-decreasing key order values to the sorted keys in order includes assigning the same key order value to multiple keys, thereby forming a grouping.

13. A method for displaying on a computer display device having a display area both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

sorting keys;

assigning non-decreasing key order values to the sorted keys in order;

selecting a reference line within the display area;

associating a minimum indicator value with a top of the list;

associating a maximum indicator value with a bottom of the list;

setting a current indicator value to the key order value assigned to the key of the item being displayed at the reference line;

setting a second indicator value to the key order value assigned to the key of the first item in the list;

setting a second-to-last indicator value to the key order value assigned to the key of the last item in the list; and displaying the indicator according to a value associated with a key of an item being displayed.

14. A method for displaying on a computer display device having a display area both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

sorting keys;

assigning non-decreasing key order values to the sorted keys in order;

selecting a reference line within the display area;

associating a minimum indicator value with a top of the list;

associating a maximum indicator value with a bottom of the list;

setting a current indicator value to the key order value assigned to the key of the item being displayed at the reference line;

setting a second indicator value to the key order value assigned to the key of the first item in the list;

setting a second-to-last indicator value to the key order value assigned to the key of the item located in the list at a position determined by enumerating from the end of the list a number of lines equal to the number of lines in a display area; and displaying the indicator according to a value associated with a key of an item being displayed.

15. A method for displaying on a computer display device having a display area both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

sorting keys;

assigning non-decreasing key order values to the sorted keys in order;

selecting a reference line within the display area;

associating a minimum indicator value with a top of the list;

associating a maximum indicator value with a bottom of the list;

setting a current indicator value to the key order value assigned to the key of the item being displayed at the reference line;

setting a second indicator value to the key order value assigned to the key of the item located at a position in the list determined by dividing the number of lines in the display area by two and adding one to the result;

setting a second-to-last indicator value to the key order value assigned to the key of the item located at a position in the list determined by dividing the number of lines in the display area by two and enumerating that number of lines back from the end of the list; and displaying the indicator according to a value associated with a key of an item being displayed.

16. A method for displaying on a computer display device having a display area both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

sorting keys;

assigning non-decreasing key order values to the sorted keys in order;

storing mapping information on a computer device in a table having a plurality of elements, each element indicating an association between a key and a key order value;

selecting a reference line within the display area;

setting a minimum indicator value to the key order value assigned to the key of the first item in the list;

setting a maximum indicator value to the key order value assigned to the key of the last item in the list;

setting a current indicator value to the key order value assigned to the key of the item being displayed at the reference line;

specifying a key;

searching the table for the element indicating the specified key; and displaying the indicator according to a key order value associated with the specified key in the element of the table.

17. A method for displaying on a computer display device both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

sorting keys;

assigning non-decreasing key order values to the sorted keys in order;

storing mapping information on a computer device in a table having a plurality of elements, each element indicating an association between a key and a key order value;

selecting a reference line within the display area;

setting a minimum indicator value to the key order value assigned to the key of the first item in the list;

setting a maximum indicator value to the key order value assigned to the key of the last item in the list;

setting a current indicator value to the key order value assigned to the key of the item being displayed at the reference line;

specifying an indicator value;

using the indicator value as key order value which is an index into the table to determine the key associated with that indicator value; and displaying the indicator according to a value associated with the specified grouping in the element of the table.

18. An apparatus for displaying on a computer display device having a display area both a portion of a sorted list having a plurality of items and sorted according to keys and an indicator approximating a location of the portion within the list, the computer display device providing the ability to randomly access entries in a list by specifying a key, the indicator having a range of values corresponding to locations on the computer display device, said method comprising the steps of:

means for sorting keys;

means for assigning non-decreasing key order values to the sorted keys in order;

means for selecting a reference line within the display area;

means for associating a minimum indicator value with a top of the list;

means for associating a maximum indicator value with a bottom of the list;

means for setting a current indicator value to the key order value assigned to the key of the item being displayed at the reference line;

means for setting a second indicator value to the key order value assigned to the key of the first item in the list;

means for setting a second-to-last indicator value to the key order value assigned to the key of the item located in the list at a position determined by enumerating from the end of the list a number of lines equal to the number of lines in a display area; and means for displaying the indicator according to a value associated with a key of an item being displayed.

* * * * *